(12) United States Patent
McAlister et al.

(10) Patent No.: US 9,208,032 B1
(45) Date of Patent: Dec. 8, 2015

(54) MANAGING CONTINGENCY CAPACITY OF POOLED RESOURCES IN MULTIPLE AVAILABILITY ZONES

(71) Applicant: Amazon Technologies, Inc., Reno, NV (US)

(72) Inventors: Grant Alexander MacDonald McAlister, Seattle, WA (US); Samuel James McKelvie, Seattle, WA (US); Anurag Windlass Gupta, Atherton, CA (US)

(73) Assignee: Amazon Technologies, Inc., Reno, NV (US)

(*) Notice: Subject to any disclaimer, the term of this patent is extended or adjusted under 35 U.S.C. 154(b) by 269 days.

(21) Appl. No.: 13/894,969

(22) Filed: May 15, 2013

(51) Int. Cl.
  G06F 17/00 (2006.01)
  G06F 7/00 (2006.01)
  G06F 11/14 (2006.01)
(52) U.S. Cl.
  CPC ................... G06F 11/1435 (2013.01)
(58) Field of Classification Search
  CPC ................... G06F 11/1471; G06F 17/30584
  USPC ........................................................... 707/683
  See application file for complete search history.

(56) References Cited

U.S. PATENT DOCUMENTS

| | | | |
|---|---|---|---|
| 5,280,612 A | 1/1994 | Lorie et al. | |
| 5,471,614 A | 11/1995 | Kakimoto | |
| 5,524,205 A | 6/1996 | Lomet et al. | |
| 5,530,850 A | 6/1996 | Ford et al. | |
| 5,870,758 A | 2/1999 | Bamford et al. | |
| 5,907,848 A | 5/1999 | Zaiken et al. | |
| 6,233,585 B1 | 5/2001 | Gupta et al. | |
| 6,240,413 B1 | 5/2001 | Learmont | |
| 6,615,219 B1 | 9/2003 | Bruso et al. | |

(Continued)

FOREIGN PATENT DOCUMENTS

EP 0675451 10/1995

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.

(Continued)

*Primary Examiner* — Pavan Mamillapalli
(74) *Attorney, Agent, or Firm* — Robert C. Kowert; Meyertons, Hood, Kivlin, Kowert & Goetzel, P.C.

(57) ABSTRACT

A network-based services provider may reserve and provision primary resource instance capacity for a given service (e.g., enough compute instances, storage instances, or other virtual resource instances to implement the service) in one or more availability zones, and may designate contingency resource instance capacity for the service in another availability zone (without provisioning or reserving the contingency instances for the exclusive use of the service). For example, the service provider may provision resource instance(s) for a database engine head node in one availability zone and designate resource instance capacity for another database engine head node in another availability zone without instantiating the other database engine head node. While the service operates as expected using the primary resource instance capacity, the contingency resource capacity may be leased to other entities on a spot market. Leases for contingency instance capacity may be revoked when needed for the given service (e.g., during failover).

22 Claims, 20 Drawing Sheets

(56) References Cited

U.S. PATENT DOCUMENTS

| | | | |
|---|---|---|---|
| 6,631,374 | B1 | 10/2003 | Klein et al. |
| 6,732,171 | B2 | 5/2004 | Hayden |
| 6,832,229 | B2 | 12/2004 | Reed |
| 6,968,513 | B1* | 11/2005 | Rinebold et al. ............... 715/854 |
| 6,976,022 | B2 | 12/2005 | Vemuri et al. |
| 7,010,645 | B2 | 3/2006 | Hetzler et al. |
| 7,089,253 | B2 | 8/2006 | Hinshaw et al. |
| 7,146,386 | B2 | 12/2006 | Xiao |
| 7,305,386 | B2 | 12/2007 | Hinshaw et al. |
| 7,308,456 | B2 | 12/2007 | Friske et al. |
| 7,716,645 | B2 | 5/2010 | Dolby et al. |
| 7,721,303 | B2* | 5/2010 | Alves de Moura et al. ... 719/328 |
| 7,747,663 | B2 | 6/2010 | Atkin et al. |
| 7,885,922 | B2 | 2/2011 | Pareek et al. |
| 7,930,271 | B2 | 4/2011 | Tarbell |
| 7,937,551 | B2 | 5/2011 | Schott |
| 7,979,670 | B2 | 7/2011 | Saliba et al. |
| 8,209,515 | B2 | 6/2012 | Schott |
| 8,255,627 | B2 | 8/2012 | Blinick et al. |
| 8,266,114 | B2 | 9/2012 | Mace et al. |
| 8,271,830 | B2 | 9/2012 | Erofeev |
| 8,289,801 | B2 | 10/2012 | Smith et al. |
| 8,301,670 | B2 | 10/2012 | Revah et al. |
| 8,326,897 | B2 | 12/2012 | Butterworth et al. |
| 8,341,128 | B1 | 12/2012 | Ruggiero |
| 8,370,715 | B2 | 2/2013 | Hafner et al. |
| 8,380,670 | B2 | 2/2013 | Kuber et al. |
| 8,392,479 | B1 | 3/2013 | Pantin |
| 8,396,831 | B2 | 3/2013 | Larson et al. |
| 8,412,689 | B2 | 4/2013 | Reid et al. |
| 8,412,752 | B2 | 4/2013 | Dodge |
| 8,429,121 | B2 | 4/2013 | Pareek et al. |
| 2002/0107835 | A1 | 8/2002 | Coram et al. |
| 2002/0143733 | A1 | 10/2002 | Mukkamalla et al. |
| 2003/0197615 | A1* | 10/2003 | Roche et al. ............... 340/573.1 |
| 2004/0111308 | A1* | 6/2004 | Yakov ............................ 705/8 |
| 2004/0133622 | A1 | 7/2004 | Clubb et al. |
| 2004/0249869 | A1 | 12/2004 | Oksanen |
| 2005/0281248 | A1* | 12/2005 | Aoki et al. .................. 370/351 |
| 2007/0260723 | A1* | 11/2007 | Cohen et al. ................. 709/223 |
| 2008/0183973 | A1 | 7/2008 | Aguilera et al. |
| 2009/0216679 | A1* | 8/2009 | Yeap et al. .................... 705/71 |
| 2010/0050172 | A1 | 2/2010 | Ferris |
| 2010/0192131 | A1 | 7/2010 | Dolby et al. |
| 2011/0035548 | A1 | 2/2011 | Kimmel et al. |
| 2011/0161496 | A1 | 6/2011 | Nicklin |
| 2012/0041899 | A1 | 2/2012 | Greene et al. |
| 2012/0174112 | A1 | 7/2012 | Vaidya et al. |
| 2012/0191648 | A1 | 7/2012 | Kuber et al. |
| 2012/0297073 | A1 | 11/2012 | Glover et al. |
| 2012/0310985 | A1 | 12/2012 | Gale et al. |
| 2012/0310986 | A1 | 12/2012 | Frantz et al. |
| 2012/0310991 | A1 | 12/2012 | Frantz et al. |
| 2013/0036281 | A1 | 2/2013 | Revah et al. |
| 2013/0042156 | A1 | 2/2013 | Srinivasan et al. |
| 2013/0080386 | A1 | 3/2013 | Dwyer et al. |
| 2013/0080388 | A1 | 3/2013 | Dwyer et al. |
| 2013/0086129 | A1 | 4/2013 | Brown et al. |
| 2013/0212650 | A1* | 8/2013 | Dabbiere et al. ................ 726/4 |
| 2013/0346227 | A1* | 12/2013 | Jain et al. .................... 705/26.3 |

OTHER PUBLICATIONS

"Bloom Filter" Downloaded from http://en.wikipedia.org/wiki/Bloom_filter on May 15, 2013, pp. 1-12.
John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.
Jim Czuprynski "Oracle Database 11g: SQL Query Result Set Caching" published Jul. 30,2008, downloaded May 15, 2013 from http://www.databasejournal.com/features/oracle/article.php/3760761/Oracle-Database-11 g-SQL -Query-Result-Set-Caching.htm, pp. 1-7.
"Oracle Database JDBC Developers Guide and Reference: Chapter 20 Statement and Result Set Caching"downloaded from http://docs.oracle.com/cd/B28359_01/java.1111b31224/stmtcach.htm via the Wayback Machine Nov. 27, 2011, pp. 1-8.
Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.
Julian Dontcheff"Bloom Filters for DBAs" published Aug. 28, 2012, downloaded from http://juliandontcheff.wordpress.com/2012/08/28/bloom-filters-for-dbas/ on May 14, 2013, pp. 1-4.
Julian Dyke "Result Cache Internals" Nov. 2007, pp. 1-38.
Michele Cyran et al "Oracle Database Concepts 10g Release 2 (10.2)" Oct. 2005, pp. 1-542.
Lance Ashdown et al "Oracle Database Concepts 11g Release 2 (11.2)" Sep. 2011, pp. 1-460.
"Isolation (database systems)" downloaded from http://en.wikipedia.org/wiki/Isolation_(database_systems) on May 15, 2013, pp. 1-7.
U.S. Appl. No. 13/892,027, filed May 10, 2013, Anurag Windlass Gupta.
U.S. Appl. No. 13/873,467, filed Apr. 20, 2013, Anurag Windlass Gupta.
U.S. Appl. No. 13/902,381, filed May 24, 2013, Anurag Windlass Gupta.
U.S. Appl. No. 13/893,004, filed May 13, 2013, Laurion Darrell Burchall.
U.S. Appl. No. 13/901,111, filed May 23, 2013, Anurag Windlass Gupta.
U.S. Appl. No. 13/903,674, filed May 28, 2013, Anurag Windlass Gupta.

* cited by examiner

MANAGING CONTINGENCY CAPACITY OF POOLED RESOURCES IN MULTIPLE AVAILABILITY ZONES

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store (e.g., a database) which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network. The provider network operator may have to try to ensure that a number of potentially competing demands are met, e.g., that all guaranteed commitments to clients (such as long-term reservations that have already been paid for) are honored, that the dynamically-varying component of resource pricing does not get so high that customer satisfaction suffers, that the provider's data center investment is justified by a reasonable level of resource utilization and revenue, and so on. In business environments where clients may choose from among multiple providers for network-based computing options, provider network operators may wish to maintain high levels of customer satisfaction and customer retention, e.g., by making resource acquisition easy and economical, and by reducing the complexity of client resource budget management as much as possible. The service provider must also balance the competing goals of providing high durability and/or availability (e.g., in the face of node or network failures) while avoiding situations in which large numbers of redundant resource instances that are provisioned to provide durability and/or availability to clients lay idle most, if not all, of the time.

One type of network-based service that is offered to clients is a database service. While distribution of various components of a software stack can in some cases provide (or support) fault tolerance (e.g., through replication), higher durability, and less expensive solutions (e.g., through the use of many smaller, less-expensive components rather than fewer large, expensive components), databases have historically been among the components of the software stack that are least amenable to distribution. For example, it can be difficult to distribute databases while still ensuring the so-called ACID properties (e.g., Atomicity, Consistency, Isolation, and Durability) that they are expected to provide. In traditional database systems, the data managed by a database system is stored on direct attached disks. If a disk fails, it is replaced and then must be reloaded with the appropriate data. For example, in many systems, crash recovery includes restoring the most recent snapshot from a backup system and then replaying any changes made since the last snapshot from that point forward. However, this approach does not scale well to large databases. In addition, in order to recover quickly from a crash, such systems often must provision redundant hardware, software, and/or network resources (at considerable expense) that are rarely, if ever, used.

Figure 1:
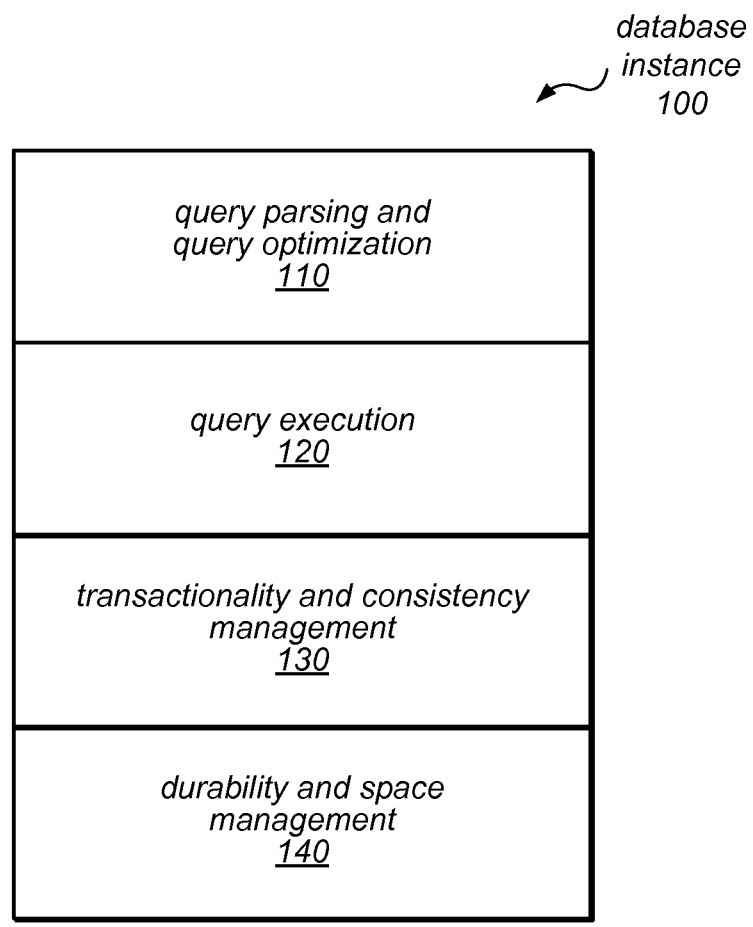
FIG. 1 is a block diagram illustrating various components of a database software stack, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The systems described herein may, in some embodiments, provide network-based virtual computing services to clients, which may include database services, data storage services, or computation services, among others. In order to provide durability and/or availability of applications executed using these services and/or client data used or generated by them, these systems may provision redundant resource instances for the services or may designate redundant resource instances as contingency resource instances for the services (e.g., in different availability zones than those in which the primary resource instance capacity for the services is provisioned or in the same availability zone). In some embodiments, while they are not being used to implement the service(s) for which they were designated as contingency resource instances, at least some of the contingency resource instances may be offered for lease to others (e.g., other clients, services, applications or processes) on a spot market. For example, while contingency resource instances may not be reserved or provisioned for the exclusive use of a particular service until and unless they are needed, they may be reclaimed for the use of the service for which they were designated as contingency resource instances at any time (e.g., to be activated as part of a crash recovery process, to allow the service to be further scaled, in order to perform maintenance on machines hosting the primary resource capacity, to improve performance, or for other purposes).

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

As previously noted, in typical large database systems, the entire data set needs to be restored before the database system can be restarted following a failure in the system. In these database systems, following a crash, the system must determine the last point at which it was known that all of the data pages had been flushed to disk (e.g., a checkpoint) and must replay any change logs from that point forward. For example, before the database can be made available to handle incoming queries from client processes, a system process must read in all of the data pages that were changed after the determined checkpoint and apply each of the applicable change log records that had not already been applied to those data pages.

In some embodiments, the database systems described herein may be able to restart the database engine following a failure (e.g., to make the database available to accept and service queries) almost immediately after a database crash, without having to wait for the entire data set to be restored. Instead, queries can be received and serviced while crash recovery is performed lazily by one or more background threads. For example, following a crash, multiple background threads may operate in parallel on different storage nodes to reconstruct data pages from corresponding redo logs. In the meantime, if an incoming query targets a data page that has not yet been reconstructed, the storage layer may be configured to re-create that data page on the fly from the appropriate redo logs.

In some embodiments, the database systems described herein may be deployed across multiple "availability zones", each of which may include its own physically distinct, independent infrastructure on which a collection of computing nodes (e.g., computing nodes on which storage system server nodes and/or database engine head nodes are implemented). In some embodiments, each availability zone may reside in a different location or region, while in other embodiments multiple availability zones may reside in the same location or region. As described in more detail herein, in some embodiments, the database systems may provision primary resource instance capacity for a given database in one availability zone (e.g., enough resource instance capacity to implement a database engine head node and one or more storage system server nodes, along with corresponding storage devices), may provision additional resource instance capacity for the given database in another availability zone (e.g., enough resource instance capacity to implement one or more redundant storage system server nodes, along with corresponding storage devices storing replicas of the data stored in the primary availability zone), and may designate still other resource instances (e.g., enough resource instance capacity to implement an additional or replacement database engine head node, if needed) as contingency resource capacity for the database in the other availability zone.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

FIG. 1 is a block diagram illustrating various components of a database software stack, according to one embodiment. As illustrated in this example, a database instance may include multiple functional components (or layers), each of which provides a portion of the functionality of the database instance. In this example, database instance 100 includes a query parsing and query optimization layer (shown as 110), a query execution layer (shown as 120), a transactionality and consistency management layer (shown as 130), and a durability and space management layer (shown as 140). As noted above, in some existing database systems, scaling a database instance may involve duplicating the entire database instance one or more times (including all of the layers illustrated in FIG. 1), and then adding glue logic to stitch them together. In some embodiments, the systems described herein may instead offload the functionality of durability and space management layer 140 from the database tier to a separate storage layer, and may distribute that functionality across multiple storage nodes in the storage layer.

In some embodiments, the database systems described herein may retain much of the structure of the upper half of the database instance illustrated in FIG. 1, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single availability zone) and/or across availability zones in a single region or in different regions. In some embodiments, the decision about whether to replicate data (and/or metadata) locally or across multiple availability zones may be dependent on a system-wide (default) policy, an application-specific or client-specific policy, or a client preference (e.g., a request by a customer or service subscriber, or a parameter value specified by a customer/subscriber as part of a request to receive database services or to create a particular database instance.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed database-optimized storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database table receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems. Note that in embodiments in which data is replicated on multiple storage system nodes in multiple availability zones, the client side driver may be configured to send asynchronous requests (including, for example, redo log records) to storage system nodes in availability zones other than the one in which the database engine head node is located.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. For example, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
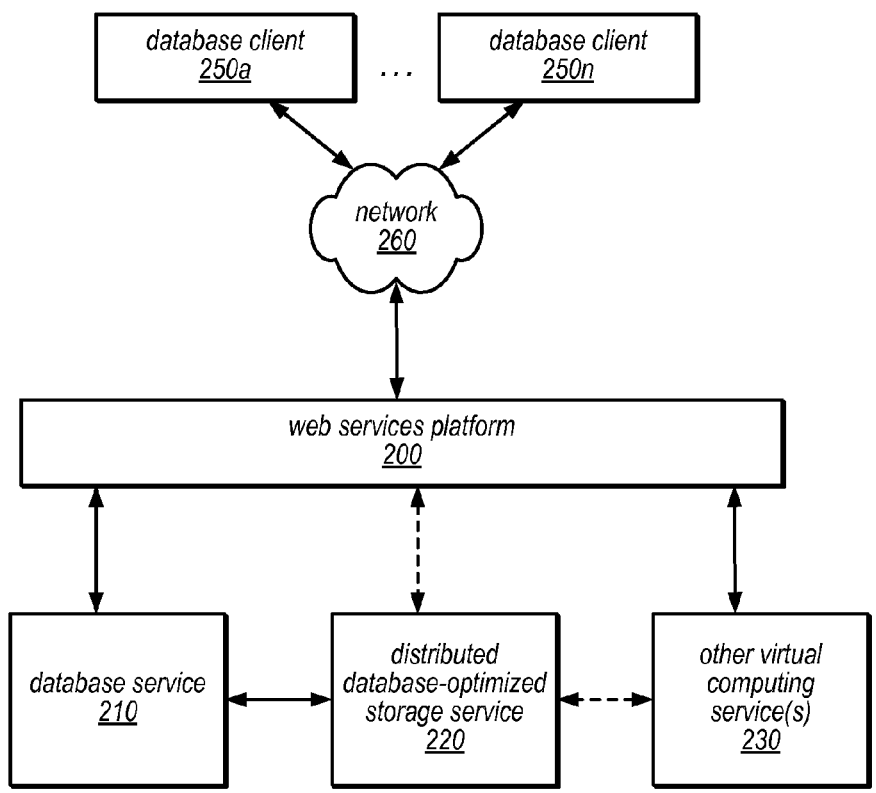
FIG. 2 is a block diagram illustrating a service system architecture that may be configured to implement a web services-based database service, according to some embodiments.

One embodiment of a service system architecture that may be configured to implement a web services-based database service is illustrated in FIG. 2. In the illustrated embodiment, a number of clients (shown as database clients 250*a*-250*n*) may be configured to interact with a web services platform 200 via a network 260. Web services platform 200 may be configured to interface with one or more instances of a database service 210, a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 20 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client that is configured to submit web services requests to web services platform 200 via network 260, including requests for database services. For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application configured to interact directly with web services platform 200. In some embodiments, client 250 may be configured to generate web services requests according to a Representational State Transfer (REST)-style web services architecture, a document- or message-based web services architecture, or another suitable web services architecture.

In some embodiments, a client 250 (e.g., a database service client) may be configured to provide access to web services-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to Web services platform 200 may be coordinated by client 250 and the operating system or file system on behalf of applications executing within the operating system environment.

Clients 250 may convey web services requests to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed database-optimized storage service 220). In such a case, clients 250 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests, such as requests to access data pages (or records thereof). For example, web services platform 200 may include hardware and/or software configured to implement a particular endpoint, such that an HTTP-based web services request directed to that endpoint is properly received and processed. In one embodiment, web services platform 200 may be implemented as a server system configured to receive web services requests from clients 250 and to forward them to components of a system that implements database service 210, distributed database-optimized storage service 220 and/or another virtual computing service 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed database-optimized storage service 220 and/or another virtual computing service 230 (or the underlying systems that implement those services). For example, in some embodiments, the system illustrated in FIG. 2 may provide other types of data storage services, temporary caching services, computation services, or any of a variety of stateful or stateless computing services, some of which may be suitable for receiving services through a resource instance spot market.

In some embodiments, platform 200 may also implement user authentication and access control procedures. For example, for a given web services request to access a particular database table, platform 200 may be configured to ascertain whether the client 250 associated with the request is authorized to access the particular database table. Platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding web services request, for example by returning a response to the requesting client 250 indicating an error condition. Various access control policies may be stored as records or lists of access control information by database service 210, distributed database-optimized storage service 220 and/or other virtual computing services 230.

It is noted that while web services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, distributed database-optimized storage service 220 may be internal to a computing system or an enterprise system that provides database services to clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed database-optimized storage service 220 in storing database tables on behalf of clients 250 may be transparent to those clients. In other embodiments, distributed database-optimized storage service 220 may be exposed to clients 250 through web services platform 200 to provide storage of database tables or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a client 250. This is illustrated in FIG. 2 by the dashed line between virtual computing service 230 and distributed database-optimized storage service 220. In other embodiments, virtual computing service 230 may be a distinct virtual computing service offering that is distinct from (and unrelated to distributed database-optimized storage service 220 and/or database service 210) In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

Figure 3:
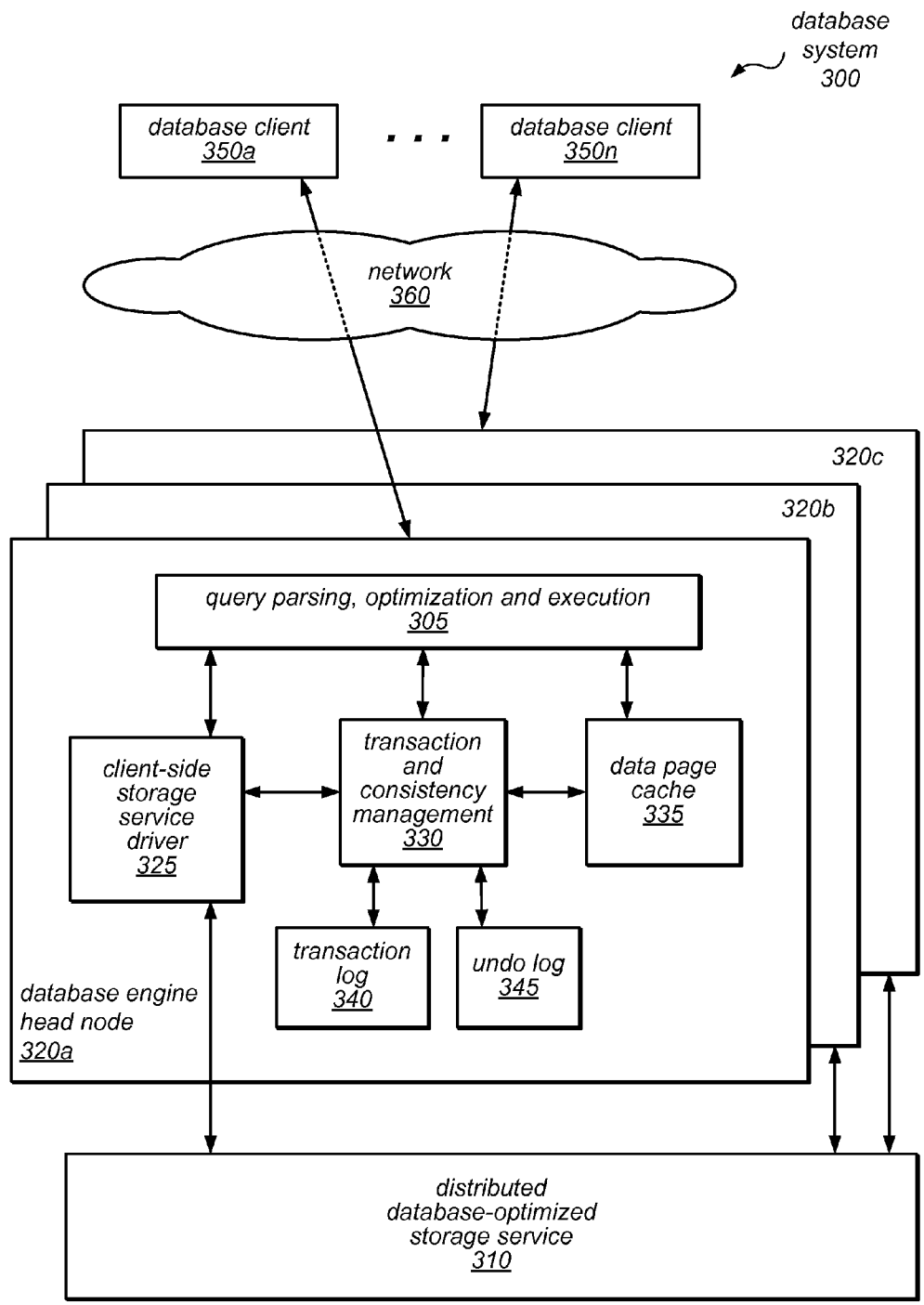
FIG. 3 is a block diagram illustrating various components of a database system that includes a database engine and a separate distributed database storage service, according to one embodiment.

FIG. 3 is a block diagram illustrating various components of a database system that includes a database engine and a separate distributed database storage service, according to one embodiment. In this example, database system 300 includes a respective database engine head node 320 for each of several database tables and a distributed database-optimized storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed database-optimized storage service 310, which may be employed by the database system to store data pages of one or more database tables (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed database-optimized storage service 310 may perform various storage, access, change logging, recovery, and/or space management operations in a manner that is invisible to storage clients 350a-350n.

As previously noted, each database instance may include a single database engine head node 320 that receives requests from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed database-optimized storage service 310, receive write acknowledgements from distributed database-optimized storage service 310, receive requested data pages from distributed database-optimized storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed database-optimized storage systems described herein may organize data in various logical volumes, segments, and pages for storage on one or more storage nodes. For example, in some embodiments, each database table is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

As described in more detail below, in some embodiments, resource instances that are used to implement the database systems and/or distributed database-optimized storage systems described herein may include both reserved resource instances (e.g., resource instances in one or more availability zones that are reserved for the exclusive use of the database system or distributed database-optimized storage system), and contingency resource instances in one or more of the same availability zones or in an availability zone other than the availability zone(s) in which the database engine head node and/or storage system server nodes are implemented (e.g., resource instances that are designated for the use of the database system or distributed database-optimized storage system in the event of a condition that warrants the activation of an additional or replacement database engine head node). In some embodiments, these contingency resource instances may be leased out (e.g., under a spot market pricing model) when they are not needed by the database system or distributed database-optimized storage system, but those leases may be revoked if and when they are needed by the database system or distributed database-optimized storage system (e.g., to replace reserved resource instances in the case of a failover condition or while performing maintenance operations on one or more nodes on which the reserved resource instances are implemented, to replace or supplement reserved resource instances to improve performance or to support additional scaling, or in response to one or more other trigger conditions being met).

As used herein, the following terms may be used to describe the organization of data by a distributed database-optimized storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database table. Each write operation may be encoded in a User Log Record (ULR), which represents a logical, ordered mutation to the contents of a single user page within the volume. As noted above, a ULR may also be referred to herein as a redo log record. Each ULR may include a unique LSN, or Logical Sequence Number. Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
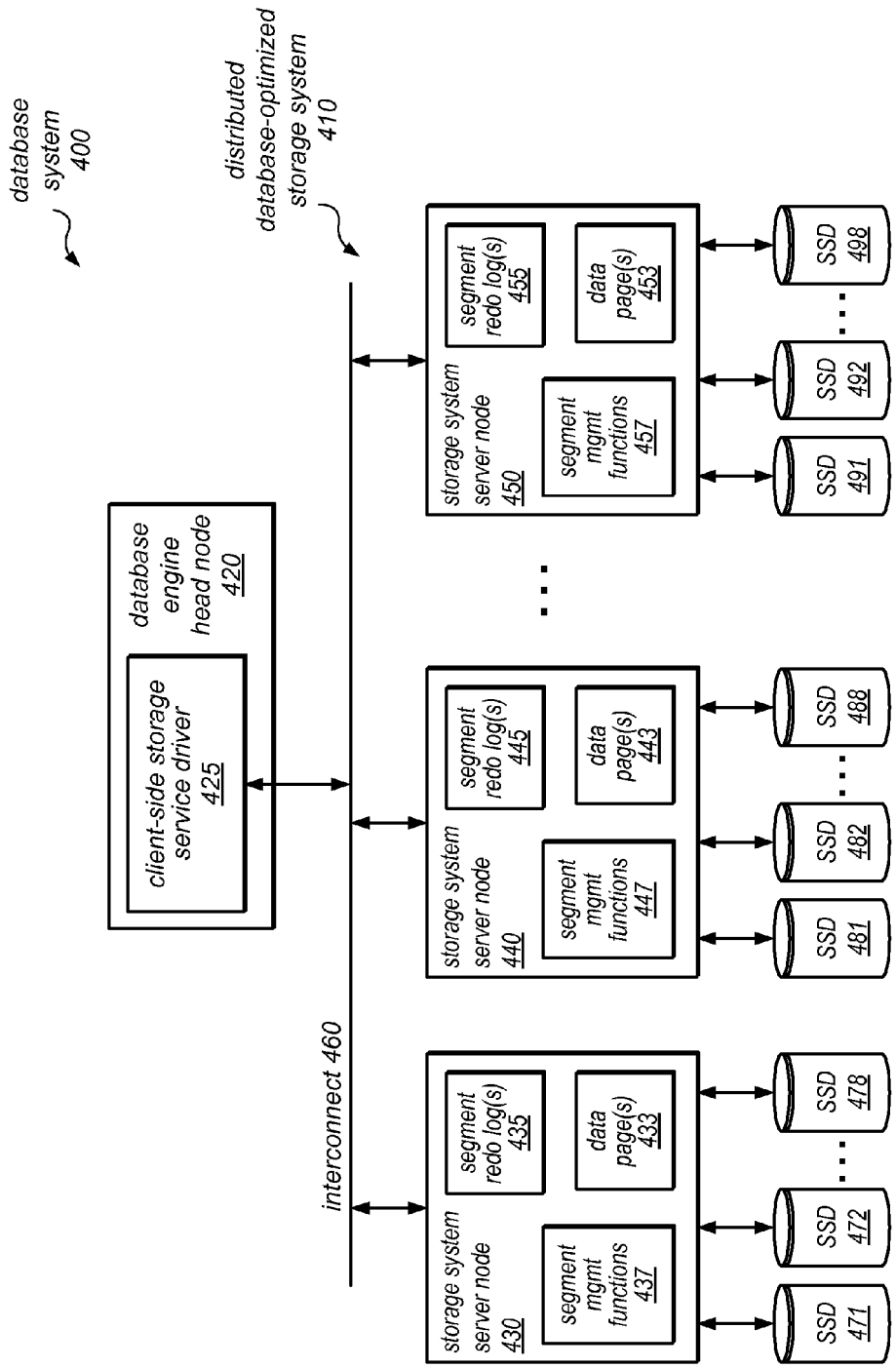
FIG. 4 is a block diagram illustrating a distributed database-optimized storage system, according to one embodiment.

One embodiment of a distributed database-optimized storage system is illustrated by the block diagram in FIG. 4. In this example, a database system 400 includes a distributed database-optimized storage system 410, which communicates with a database engine head node 420 over interconnect 460. As in the example illustrated in FIG. 3, database engine head node 420 may include a client-side storage service driver 425. In this example, distributed database-optimized storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-

478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed database-optimized storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

Figure 5:
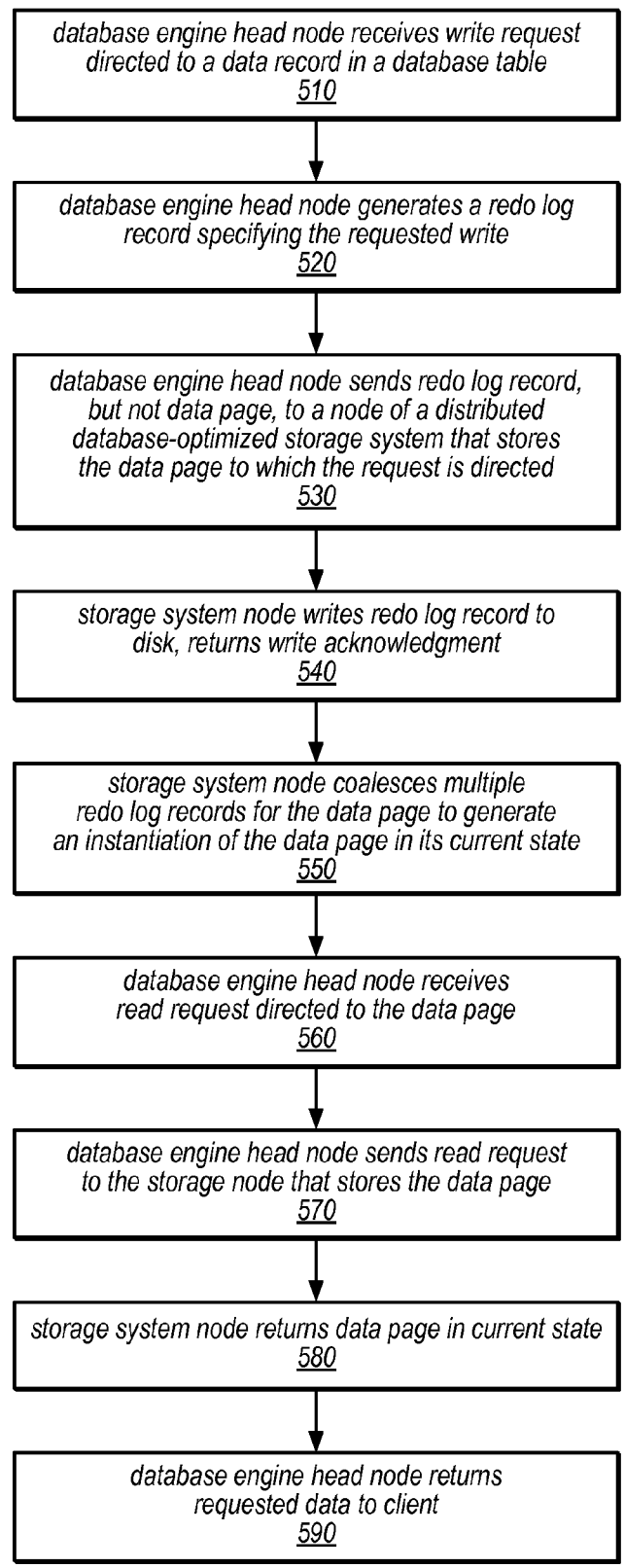
FIG. 5 is a flow diagram illustrating one embodiment of a method for accessing data in a database system that includes a database engine and a separate distributed database storage service.

One embodiment of a method for accessing data in a database system that includes a database engine and a separate distributed database storage service, such as those described herein, is illustrated by the flow diagram in FIG. 5. As illustrated at 510, in this example, the method may include a database engine head node receiving (e.g., from a database client) a write request directed to a data record in a database table. For example, the write request may specify that a new data record should be added to the database table (or to a particular data page thereof) or may specify a modification to an existing data record in a particular data page of the database table. The method may include the database engine head node generating a redo log record specifying the requested write, as in 520, and sending the redo log record (but not the particular data page to which the request is directed) to a node (or nodes) of a distributed database-optimized storage system that stores the particular data page, as in 530. As previously noted, this may include sending the redo log record to a node (or nodes) on which the data page is replicated locally (e.g., within the same availability zone or region) and/or a node (or nodes) in multiple or different availability zones or regions (e.g., an availability zone other than the one in which the database engine head node is implemented), in different embodiments.

As illustrated in this example, the method may include, in response to receiving the redo log record, the storage system node(s) writing the redo log record to disk (or to another type of persistent storage media), and returning a write acknowledgment to the database engine head node, as in 540. In some embodiments, in response to receiving the write acknowledgement(s), the database engine head node may return a corresponding write acknowledgement to the client from whom the write request was received (not shown). As illustrated in this example, at some point in time (e.g., at a point in time subsequent to receiving the redo log record and returning the write acknowledgement), the method may include the storage system node(s) coalescing multiple redo log records for the particular data page (including, for example, the redo log record that was written to disk at step 540) to generate an instantiation of the particular data page in its current state, as in 550. For example, coalescing the redo log may include applying to a previously instantiated version of the particular data page all of the redo logs that have been received by the storage system for the particular data page but that have not yet been applied to an instance of the particular data page to provide an up-to-date version of the particular data page. Note that in some embodiments, an up-to-date version of the particular data page may be generated directly from one or more redo logs, e.g., without applying them to a previously stored version of the particular data page.

As illustrated in FIG. 5, the method may also include (e.g., at some point subsequent to coalescing redo logs to create an up-to-date version of the particular data page) the database engine head node receiving a read request directed to the particular data page, as in 560. In response, the database engine head node may send a corresponding read request to a storage node that stores the particular data page (e.g., one of the storage nodes in the primary AZ or one in a secondary AZ), as in 570. Note that, in this example, it is assumed that the database engine head node does not store a current version of the particular data page in its cache. Otherwise, the method may include database engine head node responding to the read request itself (e.g., by returning the requested data from its cache), rather than sending a corresponding read request to one of the storage system nodes. As illustrated in this example, the method may include the storage system node to which the request was sent returning the particular data page to the database engine head node in its current state, as in 580, after which the database engine head node may return the requested data to the client from whom the read request was received, as in 590.

In various embodiments, the version of the particular data page that is returned to the database engine head node (e.g., in step 580) may be the same version that was generated by the coalescing operation in step 550, or may be a more recent version that was created by a subsequent coalescing operation (e.g., one that applied additional redo log records that were subsequent to the coalescing operation in step 550). For example, an additional coalescing operation may have been performed at the storage system node(s) in response to the receipt of the read request from the database engine head node, as part of a database crash recovery operation, or in response to another type of trigger, in different embodiments. Note that in some embodiments, the operations illustrated in FIG. 5 for accessing data in a database system that includes a database engine and a separate distributed database storage service may be performed automatically (e.g., without user intervention) in the database system in response to receiving a request to access the data.

In some embodiments, each of the storage system server nodes in the distributed database-optimized storage system may implement a set of processes running on the node server's operating system that manage communication with the database engine head node, e.g., to receive redo logs, send back data pages, etc. In some embodiments, all data blocks written to the distributed database-optimized storage system may be backed up to long-term and/or archival storage (e.g., in a remote key-value durable backup storage system).

Figure 6:
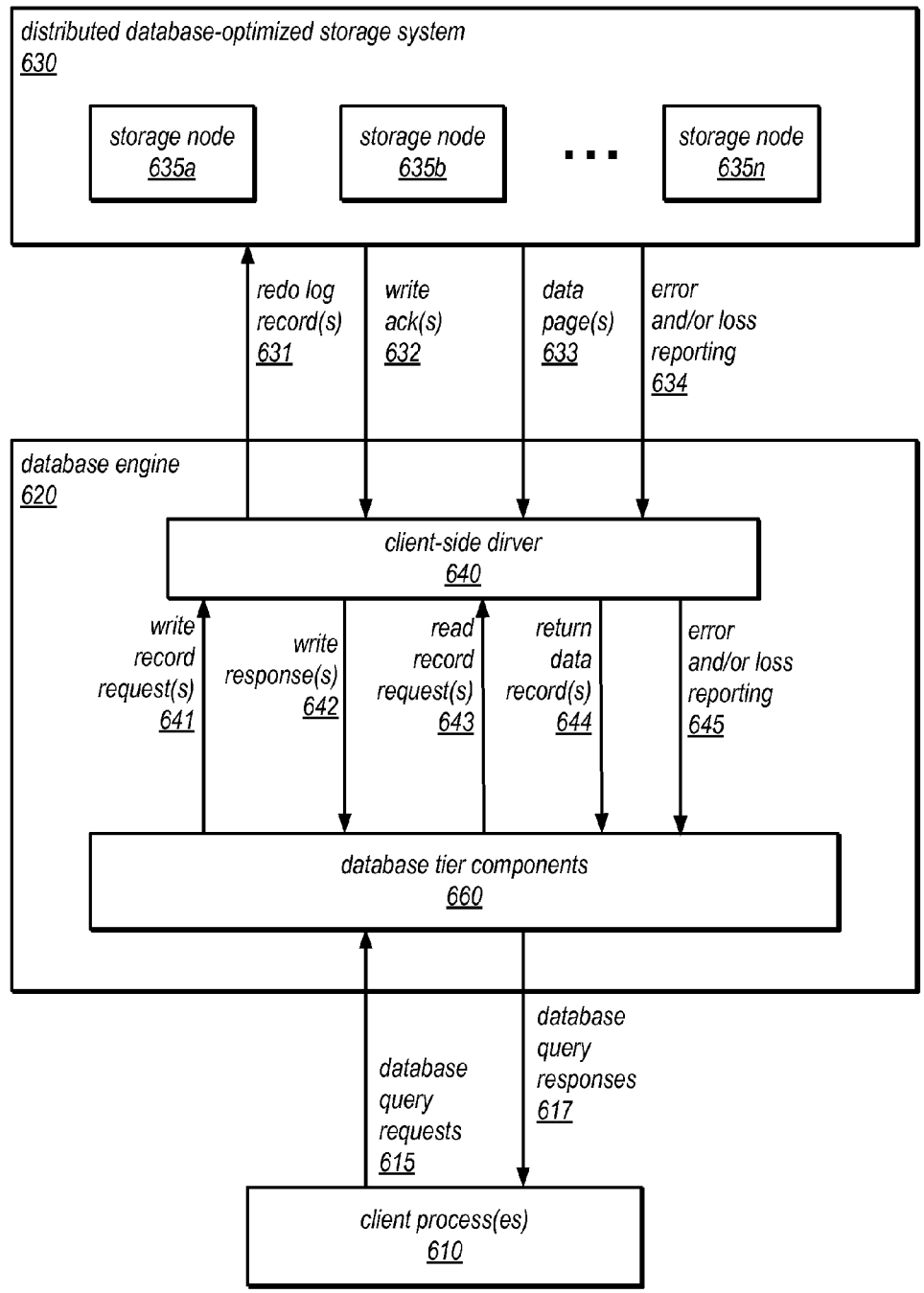
FIG. 6 is a block diagram illustrating the use of a separate distributed database-optimized storage system in a database system, according to one embodiment.

FIG. 6 is a block diagram illustrating the use of a separate distributed database-optimized storage system in a database system, according to one embodiment. In this example, one or more client processes 610 may store data to one or more database tables maintained by a database system that includes a database engine 620 and a distributed database-optimized storage system 630. In the example illustrated in FIG. 6, database engine 620 includes database tier components 660 and client-side driver 640 (which serves as the interface between distributed database-optimized storage system 630 and database tier components 660). In some embodiments, database tier components 660 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 610 may send database query requests 615 (which may include read and/or write requests targeting data stored on one or more of the storage nodes 635*a*-635*n*) to database tier components 660, and may receive database query responses 617 from database tier components 660 (e.g., responses that include write acknowledgements and/or requested data). Each database query request 615 that includes a request to write to a data page may be parsed and optimized to generate one or more write record requests 641, which may be sent to client-side driver 640 for subsequent routing to distributed database-optimized storage system 630. In this example, client-side driver 640 may generate one or more redo log records 631 corresponding to each write record request 641, and may send them to specific ones of the storage nodes 635 of distributed database-optimized storage system 630. Distributed database-optimized storage system 630 may return a corresponding write acknowledgement 623 for each redo log record 631 to database engine 620 (specifically to client-side driver 640). Client-side driver 640 may pass these write acknowledgements to database tier components 660 (as write responses 642), which may then send corresponding responses (e.g., write acknowledgements) to one or more client processes 610 as one of database query responses 617.

In this example, each database query request 615 that includes a request to read a data page may be parsed and optimized to generate one or more read record requests 643, which may be sent to clients-side driver 640 for subsequent routing to distributed database-optimized storage system 630. In this example, client-side driver 640 may send these requests to specific ones of the storage nodes 635 of distributed database-optimized storage system 630, and distributed database-optimized storage system 630 may return the requested data pages 633 to database engine 620 (specifically to client-side driver 640). Client-side driver 640 may send the returned data pages to the database tier components 660 as return data records 644, and database tier components 660 may then send the data pages to one or more client processes 610 as database query responses 617.

In some embodiments, various error and/or data loss messages 634 may be sent from distributed database-optimized storage system 630 to database engine 620 (specifically to client-side driver 640). These messages may be passed from client-side driver 640 to database tier components 660 as error and/or loss reporting messages 645, and then to one or more client processes 610 along with (or instead of) a database query response 617.

In some embodiments, the APIs 631-634 of distributed database-optimized storage system 630 and the APIs 641-645 of client-side driver 640 may expose the functionality of the distributed database-optimized storage system 630 to database engine 620 as if database engine 620 were a client of distributed database-optimized storage system 630. For example, database engine 620 (through client-side driver 640) may write redo log records or request data pages through these APIs to perform (or facilitate the performance of) various operations of the database system implemented by the combination of database engine 620 and distributed database-optimized storage system 630 (e.g., storage, access, change logging, recovery, and/or space management operations). As illustrated in FIG. 6, distributed database-optimized storage system 630 may store data blocks on storage nodes 635*a*-635*n*, each of which may have multiple attached SSDs. In some embodiments, distributed database-optimized storage system 630 may provide high durability for stored data blocks through the application of various types of redundancy schemes, including those that are deployed across multiple availability zones and/or those in which contingency resource instances are designated for use in the case of node-specific or AZ-wide failures or other trigger conditions warranting the activation of the contingency resource instances.

Note that in various embodiments, the API calls and responses between database engine 620 and distributed database-optimized storage system 630 (e.g., APIs 631-634) and/or the API calls and responses between client-side driver 640 and database tier components 660 (e.g., APIs 641-645) in FIG. 6 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 620 and/or distributed database-optimized storage system 630.

As noted above, in some embodiments, the functional components of a database system may be partitioned between those that are performed by the database engine and those that are performed in a separate, distributed, database-optimized storage system. In one specific example, in response to receiving a request from a client process (or a thread thereof) to insert something into a database table (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed database-optimized storage service and to send it to the distributed database-optimized storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log, both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

Figure 7:
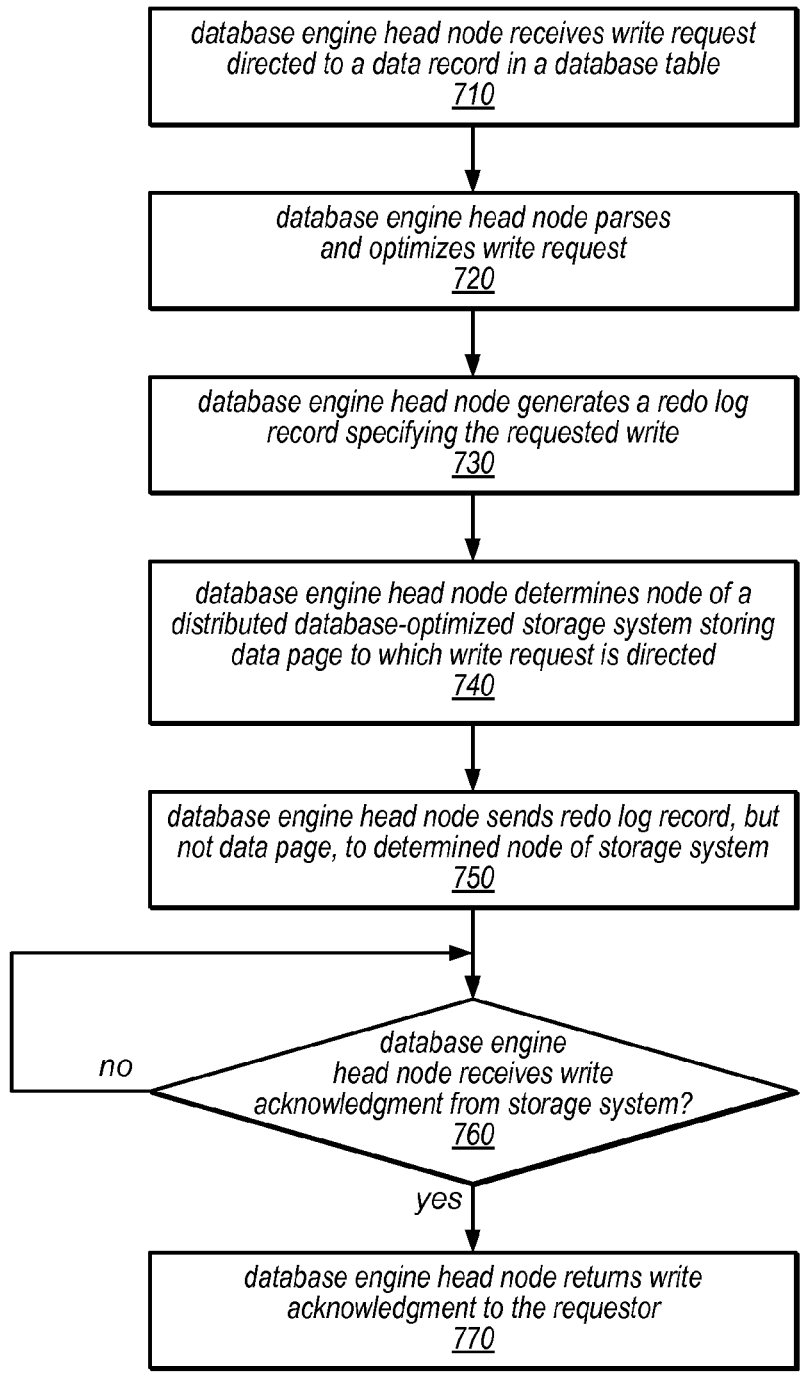
FIG. 7 is a flow diagram illustrating one embodiment of a method for performing a write operation in a database system, from the perspective of the database engine.

One embodiment of a method for performing a write operation in a database system, from the perspective of the database engine, is illustrated by the flow diagram in FIG. 7. As illustrated at 710, in this example, the method may include the database engine head node receiving (e.g., from a database client) a write request directed to a data record in a database table. For example, the write request may specify that a new data record should be added to the database table (or to a particular data page thereof) or may specify a modification to an existing data record in a particular data page of the database table. The method may also include the database engine head node (or a particular component thereof) parsing and/or optimizing the write request, as in 720. For example, in some embodiments, the database engine head node may be responsible for generating a query execution plan. As illustrated in FIG. 7, the method may include the database engine head node generating a redo log record specifying the requested write, as in 730, and the database engine head node (or, more specifically, a client-side storage service driver on the database engine head node) determining the node of a distributed database-optimized storage system that stores the particular data page to which the write request is directed, as in 740.

As illustrated in this example, the method may include the database engine head node (or, more specifically, the client-side storage service driver on the database engine head node) sending the redo log record, but not any version of the particular data page, to the determined node of storage system, as in 750. As illustrated in FIG. 7, there may be no other action taken by the database engine head node with respect to the write request until (and unless) the database engine head node (or, more specifically, the client-side storage service driver on the database engine head node) receives an acknowledgment of the write from the storage system. Once this acknowledgement is received (shown as the positive exit from 760), the method may include the database engine head node returning a corresponding write acknowledgment to the requestor (e.g., to the client from whom the write request was received), as in 770. Note that in some embodiments, if a write acknowledgement is not received from the storage system within a pre-determined time period, the database engine head node (or, more specifically, the client-side storage service driver on the database engine head node) may be configured to determine that the determined storage node has failed (or is degraded) or that some other error condition exists in the storage system. Note also that the operations illustrated in FIG. 7 for performing a write operation may be performed automatically (e.g., without user intervention) in the database system in response to receiving a write request.

Figure 8:
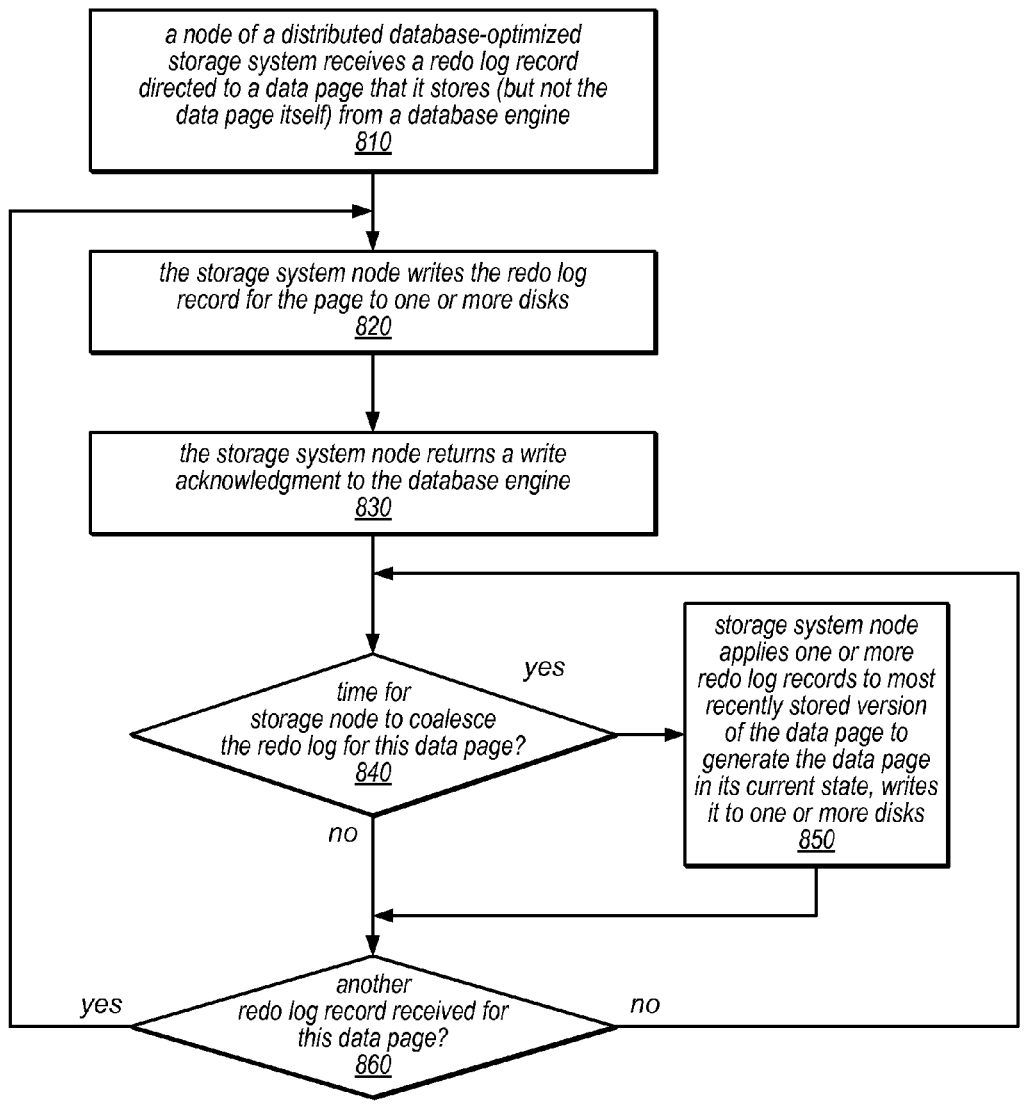
FIG. 8 is a flow diagram illustrating one embodiment of a method for performing a write operation in a database system, from the perspective of a distributed database-optimized storage system.

One embodiment of a method for performing a write operation in a database system, from the perspective of a distributed database-optimized storage system, is illustrated by the flow diagram in FIG. 8. As illustrated at 810, in this example, the method may include a node of a distributed database-optimized storage system (e.g., a storage system server node in a primary or secondary AZ) receiving a redo log record that is directed to a particular data page that the node stores (but not any version of the particular data page itself) from a database engine (e.g., from a client-side storage service driver of a database head node), or from another client of the storage system. In response to receiving the redo log record, the method may include the storage system node writing the redo log record for the page to one or more disks (or to another type of persistent storage media), as in 820. For example, the storage system node may append the redo log record to a redo log for the particular data page that is stored on a particular disk, or to any of a number of replicas of such a redo log that are stored on one or more disks in the same availability zone or in each of two or more different availability zones, in different embodiments. Once one or more copies of the redo log record have been successfully written (according to a system-wide, application-specific, or client-specified durability policy), the method may also include the storage system node returning a write acknowledgment to the database engine (or other client of the storage system) as in 830. Note that the storage system node may return the write acknowledgement to the database engine at any time after successfully writing the redo log record, regardless of whether or not the redo log record has been applied to a previously instantiated version of the particular data page to which it is directed on the storage system node yet.

As illustrated in this example, if it is time for the storage system node to coalesce one or more redo log records for the particular data page to create an up-to-date version of the particular data page (shown as the positive exit from 840), the method may include the storage system node applying one or more redo log records to the most recently stored version of the particular data page to generate a new version of the particular data page in its current state, and writing that new version of the particular data page to one or more disks (as in 850). For example, the coalesce operation may include the application of all redo log records that were received since the last coalesce operation (and/or that have not yet been applied to any version of the particular data page) to the most recently instantiated version of the particular data page. In other embodiments, a current version of the particular data page may be generated directly from one or more redo logs, e.g., without applying them to a previously stored version of the particular data page. As described herein, there may be a variety of ways to determine when it is time to coalesce pending redo log records for a given data page, in different embodiments. For example, a coalesce operation may be triggered for a data page at regular (e.g., periodic) time intervals, in response to receiving a single redo log targeting the data page, in response to having received a pre-determined number of redo log records targeting the data page or a pre-determined number of redo log records targeting the data page within a given time period, in response to receiving a read request targeting the data page, in response to the initiation of a crash recovery operation, or according to any other suitable policy.

As illustrated in FIG. 8, if it is not time for the storage system node to coalesce redo log records for the particular data page (shown as the negative exit from 840), but another redo log record targeting the particular data page is received (shown as the positive exit from 860), the method may include repeating the operations illustrated at 820-860 for the additional redo log record. In this example, as more redo log records targeting the particular data page are received by the storage system, the storage system node may repeat the operations illustrated at 820-860 for each additional redo log record, and the storage system node may coalesce the redo log records for the particular data page from time to time, according to one or more applicable triggers and/or policies. This is illustrated in FIG. 8 by the feedback from the positive exit of 860 to 820, and the feedback from the negative exit of 860 to 840. Note that the operations illustrated in FIG. 8 for performing a write operation may be performed automatically (e.g., without user intervention) in the storage system in response to receiving a redo log record.

Note that, in some embodiments, some data pages (e.g., data pages that are rarely, if ever, accessed) may never be generated (e.g., through a coalesce operation) and/or persisted in memory. For example, in some embodiments, any redo log records directed to such data pages may be stored (e.g., persisted in memory) by one or more storage system nodes, but these redo log records may not be used to generate a complete version of those data pages until or unless a request to read them is received. In such embodiments, even if a version of such a data page is generated (e.g., in response to a read request), it may not be persisted in memory (e.g., if it is unlikely to be accessed again soon, often, or ever), but instead may be discarded at any point after it is returned to the requestor.

Figure 9:
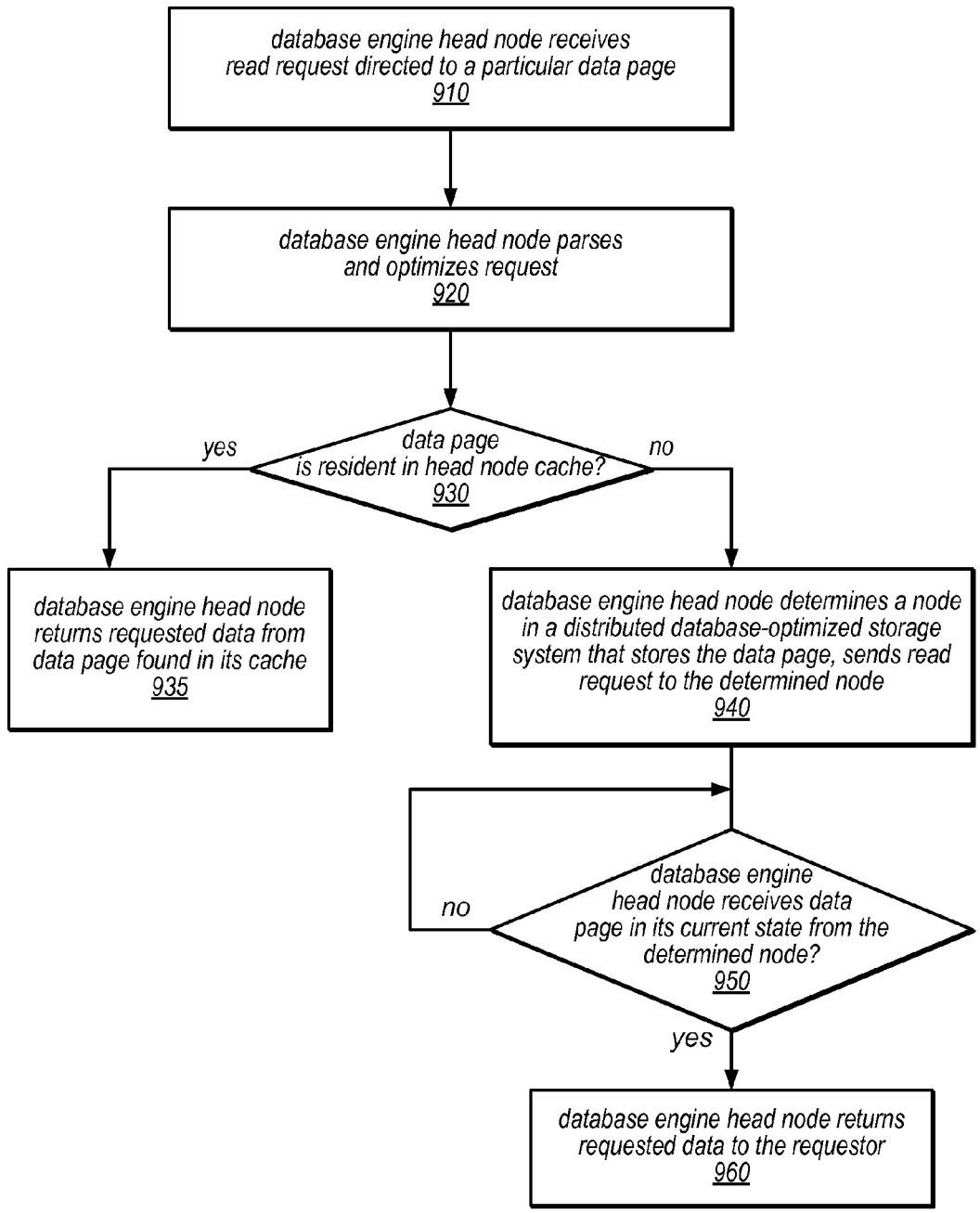
FIG. 9 is a flow diagram illustrating one embodiment of a method for performing a read operation in a database system, from the perspective of the database engine.

One embodiment of a method for performing a read operation in a database system, from the perspective of the database engine, is illustrated by the flow diagram in FIG. 9. As illustrated at 910, in this example, the method may include the database engine head node receiving (e.g., from a database client), a read request directed to a particular data page. The method may also include the database engine head node (or a particular component thereof) parsing and/or optimizing the read request, as in 920. For example, in some embodiments, the database engine head node may be responsible for generating a query execution plan. As illustrated in FIG. 9, if the particular data page is resident in the cache of the database engine head node, shown as the positive exit from 930, the method may include the database engine head node returning the requested data from the version of the particular data page found in its cache, as in 935. For example, in some embodiments, the database engine head node may temporality hold copies of the most recently accessed data pages in its cache, and may update those copies in response to receiving write requests directed to them (e.g., in addition to generating and passing redo log records for those write requests to a distributed database-optimized storage system). In some such embodiments, if a particular data page targeted by a read operation is resident in the cache, it may be assumed to be an up-to-date version of the particular data page (e.g., it may be assumed that all redo log records targeting the data page have already been applied to the version of the particular data page that is stored in the cache).

As illustrated in FIG. 9, if the particular data page is not resident in the cache of the database engine head node, shown as the negative exit from 930, the method may include the database engine head node (or, more specifically, a client-side storage service driver on the database engine head node) determining a node in a distributed database-optimized storage system that stores the particular data page, and sending a corresponding read request to the determined storage system node, as in 940. As illustrated in FIG. 9, there may be no other action taken by the database engine head node with respect to the read request until (and unless) the database engine head node (or, more specifically, the client-side storage service driver on the database engine head node) receives the particular data page (in its current state) from the storage system. Once the database engine head node (or, more specifically, the client-side storage service driver on the database engine head node) receives the particular data page in its current state from the determined storage system node (shown as the positive exit from 950), the method may include the database engine head node returning the requested data to the requestor (e.g., the client from whom the read request was received), as in 960. For example, if the version of the particular data page received from the determined storage system node is a version of the particular data page to which all redo log records targeting the particular data page to date have been applied (or at least all of the redo log records that could be applied while maintaining the transactionality and consistency properties of the database system), the database engine head node may return the requested data from the version of the particular data page received from the determined storage system node. Note that in some embodiments, if a current copy of the particular data page is not received from the storage system within a pre-determined time period, the database engine head node (or, more specifically, the client-side storage service driver on the database engine head node) may be configured to determine that the determined storage node has failed (or is degraded) or that some other error condition exists in the storage system. Note also that the operations illustrated in FIG. 9 for performing a read operation may be performed automatically (e.g., without user intervention) in the database system in response to receiving a read request.

Figure 10:
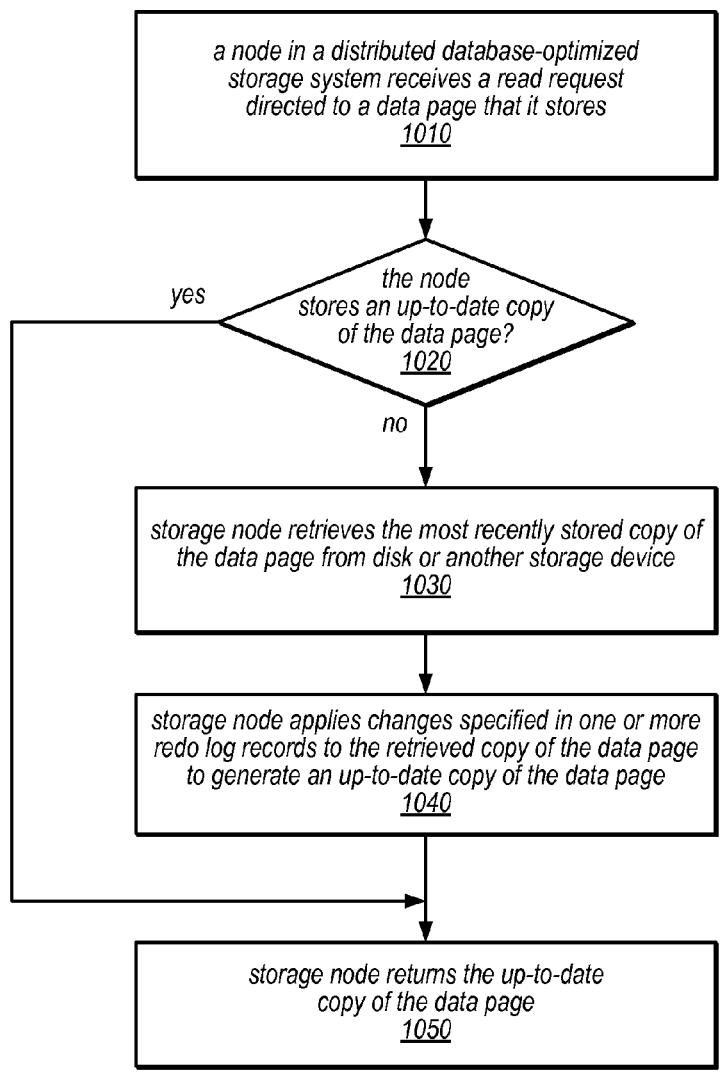
FIG. 10 is a flow diagram illustrating one embodiment of a method for performing a read operation in a database system, from the perspective of a distributed database-optimized storage system.

One embodiment of a method for performing a read operation in a database system, from the perspective of a distributed database-optimized storage system, is illustrated by the flow diagram in FIG. 10. As illustrated at 1010, in this example, the method may include a node in a distributed database-optimized storage system receiving a read request directed to a particular data page that is stored by the storage system node. In different embodiments, the storage system may receive the read request from a database engine (e.g., from a client-side storage service driver of a database head node), or from another storage service client. As illustrated in this example, if the storage system node stores an up-to-date copy of the data page (shown as the positive exit from 1020), the method may include the storage system node returning the up-to-date copy of the data page that it already stores, as in 1050. For example, if all of the redo log records targeting the particular block that have been received by the storage system node to date (or at least all of the redo log records that could be applied while maintaining the transactionality and consistency properties of the database system) have been applied to the particular data page (e.g., if they have been coalesced to create a current version of the particular data page), the storage system node may not need to perform an additional coalesce operation on the redo log records for the particular data page before returning a response.

On the other hand, if the storage system node does not store an up-to-date copy of the data page (shown as the negative exit from 1020), the method may include the storage system node retrieving the most recently stored copy of the particular data page from disk or from another persistent storage device, as in 1030, and then applying changes specified in one or more redo log records for the particular data page to the retrieved copy of the particular data page to generate an up-to-date copy of the particular data page, as in 1040. For example, the storage system node may apply to the retrieved copy of the particular data page any and all redo log records targeting the particular data page that have been received by the storage system node to date, but that have not yet been applied to the particular data page. Once the storage system node has created the up-to-date copy of the particular data page, the storage system node may return the newly created copy of the particular data page to the database engine (or other storage system client) as the up-to-date copy of the data page (as in 1050). Note that the operations illustrated in FIG.

10 for performing a read operation may be performed automatically (e.g., without user intervention) in the storage system in response to receiving a read request.

As previously noted, a protection group (PG) is an abstract distributed entity that represents a unit of durability formed by a collection of segments. In some embodiments, a protection group may represent one or more extents within a volume. A protection group may expose interfaces for one or more extents, and may encapsulate (and hide) one or more segments and associated metadata. The protection group may be responsible for maintaining durability of the extents that it exposes, according to durability policy configured for the protection group. In some embodiments, a protection group may achieve durability of all of its constituent extents by using redundant segments to persist extent data, and by actively maintaining such redundancy. The way in which the protection group maps extent read/write operations onto the underlying segments may be opaque to the users of the extents. Different redundancy strategies may be employed in different embodiments, including, but not limited to extent mirroring, extent erasure coding, and/or lazy replication.

A "mirrored protection group" is a protection group in which each of the constituent segments is a synchronous mirrored copy of a single extent. In this model, a change is considered durable if it has been made durable on all affected synchronous mirrored segments within the protection group. Protection groups may be formed within a single availability zone or across multiple availability zones. For example, for a protection group that encapsulates only segments within a particular availability zone, the availability of the protection group may be tied directly to availability of the associated availability zone. In some embodiments, a regional protection group may encapsulate segments across multiple availability zones. In some such embodiments, the regional protection group may be implemented as a collection of corresponding AZ Protection Groups, one from each AZ.

Figure 11:
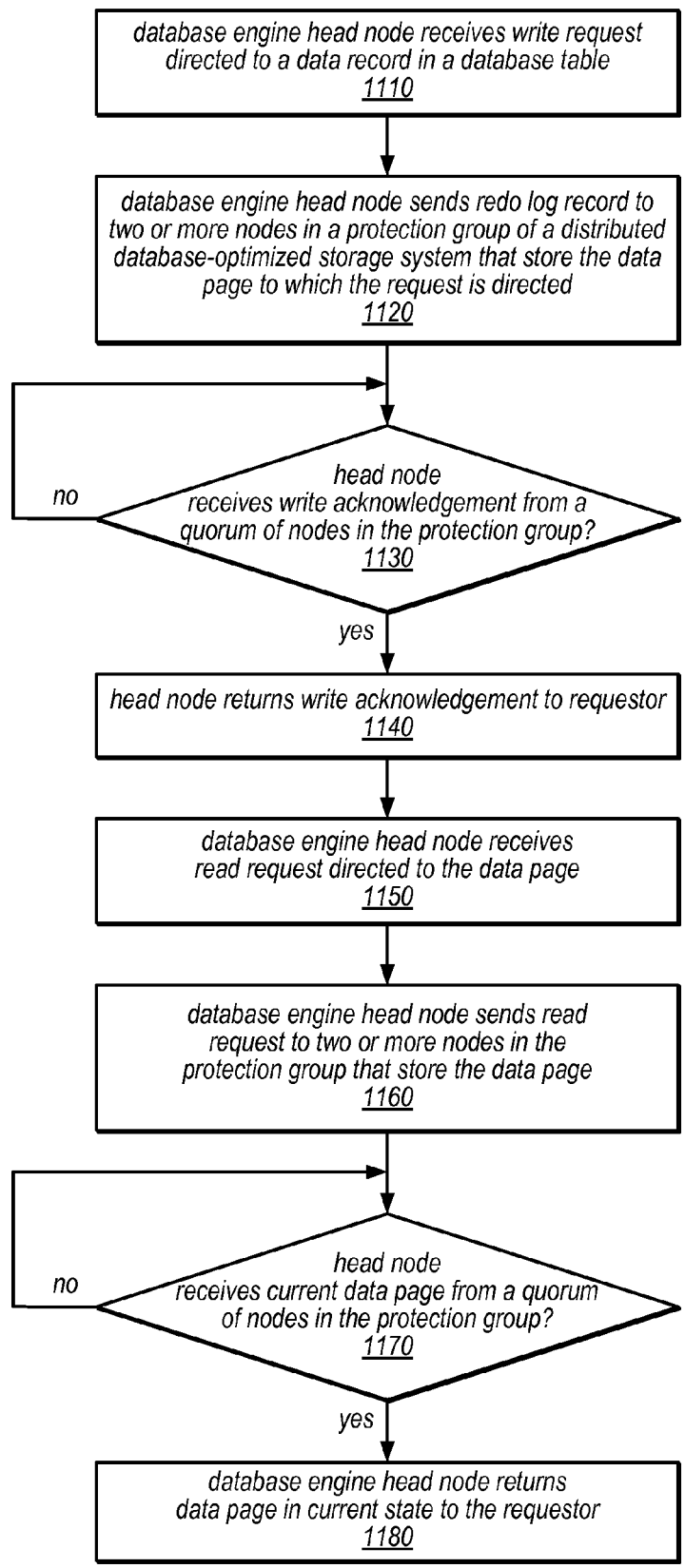
FIG. 11 is a flow diagram illustrating one embodiment of a method for performing read and write operations in a distributed database-optimized storage system that includes protection groups.

One embodiment of a method for performing read and write operations in a distributed database-optimized storage system that includes protection groups is illustrated by the flow diagram in FIG. 11. As illustrated at 1110, in this example, the method may include a database engine head node of a database tier receiving (e.g., from a database client) a write request directed to a data record in a database table. For example, the write request may specify that a new data record should be added to the database table (or to a particular data page thereof) or may specify a modification to an existing data record in a particular data page of the database table. In response to receiving the write request, the method may include the database engine head node (or, more specifically, a client-side storage service driver on the database engine head node) sending a redo log record (but not a copy of the particular data page to which the write request is directed) to two or more storage nodes in a protection group of a distributed database-optimized storage system that store the particular data page to which the request is directed, as in 1120.

As illustrated in this example, until the database engine head node (or, more specifically, the client-side storage service driver on the database engine head node) receives an acknowledgement that the write was successfully completed from a quorum of the storage nodes in the protection group, the database engine head node may wait to receive a write acknowledgement from a quorum of the storage nodes in the protection group. This is illustrated in FIG. 11 by the feedback from the negative exit from 1130 to the input to 1130. Once the database engine head node has received a write acknowledgement from a quorum of the storage nodes in the protection group (shown as the positive exit from 1130), the method may include the database engine head node returning a corresponding write acknowledgement to the requestor (e.g., to the database client), as in 1140. Note that in some embodiments, if a write acknowledgement is not received from a quorum of the storage nodes in the protection group within a pre-determined time period, the database engine head node (or, more specifically, the client-side storage service driver on the database engine head node) may be configured to determine that one or more of the storage nodes in the protection group have failed (or are degraded) or that some other error condition exists in the storage system.

As illustrated in FIG. 11, the method may include (e.g., at some point in time subsequent to receiving and responding to the write request), the database engine head node (or, more specifically, the client-side storage service driver on the database engine head node) receiving a read request directed to the particular data page (as in 1150). In response to receiving the read request, the method may include the database engine head node (or, more specifically, the client-side storage service driver on the database engine head node) sending a read request to two or more storage nodes in the protection group that store the particular data page (as in 1160).

As illustrated in this example, until the database engine head node (or, more specifically, the client-side storage service driver on the database engine head node) receives a current copy of the particular data page from a quorum of the storage nodes in the protection group, the database engine head node may wait to receive a current copy of the particular data page from a quorum of the storage nodes in the protection group. For example, in some embodiments, one or more of the storage nodes in the protection group may not store a current copy of the particular data page and may have to create a current copy of the particular data page by applying one or more pending redo log records to an earlier version of the particular data page (e.g., in a coalesce operation) before responding. This is illustrated in FIG. 11 by the feedback from the negative exit from 1170 to the input to 1170. Once the database engine head node has received a current copy of the particular data page from a quorum of the storage nodes in the protection group (shown as the positive exit from 1170), the method may include the database engine head node returning a current copy of the data page to the requestor (e.g., to the database client), as in 1180. Note that in some embodiments, if a current copy of the particular data page is not received from a quorum of the storage nodes in the protection group within a pre-determined time period, the database engine head node (or, more specifically, the client-side storage service driver on the database engine head node) may be configured to determine that one or more of the storage nodes in the protection group have failed (or are degraded) or that some other error condition exists in the storage system. Note also that the operations illustrated in FIG. 11 for performing write operations or for performing read operations may be performed automatically (e.g., without user intervention) in the database system in response to receiving requests to do so.

Some existing database systems flush all data pages to disk periodically (e.g., checkpointing all of the pages once every 5 minutes). In such systems, if there is a crash, the system might have to replay a large number of redo log records to re-create the current version of a data page to which a lot of changes were directed since the last time that data page was flushed. For example, this may be the case for a hot data page in the cache to which large numbers of changes are continuously directed, such as a page in which a sequence number is incremented each time an incoming order is received in an e-commerce application. Instead of checkpointing all data pages stored in the system at one time, in the systems described herein, checkpointing may be performed on a data block (e.g., data page) basis, rather than on a database or segment basis. For example, in some embodiments, checkpointing may be performed at each storage node, and each of the data pages stored on a particular storage node may be coalesced to create a new version of data page (e.g., a checkpoint of that data page) on the storage node only when it is warranted (e.g., when the number of redo log records its own redo log reaches a pre-determined number). In such embodiments, the database tier may not be involved in checkpointing at all. Instead, checkpointing may be a distributed process (e.g., a background process) that is the responsibility of the storage nodes themselves. Note that because checkpointing may be performed by a background process on the storage tier (which may have visibility into other foreground and/or background activities affecting each storage node), in some embodiments, the storage tier (or one of the storage system server nodes thereof) may be configured to postpone a checkpointing operation for a particular storage node if it is being heavily loaded by another foreground or background process. In some embodiments, postponing a checkpointing operation may prevent checkpointing from adversely affecting foreground latency.

In some embodiments, various in-memory data structures (such as those described herein) may be needed for a segment to function. In some embodiments, these in-memory structures may be built up during startup (e.g., following a crash) by doing a full scan of all log pages. In some embodiments, periodic checkpoints of some of these in-memory data structures may be performed to reduce startup time following a crash.

In some existing database systems, the database tier may need to write data pages out to the storage layer at the same frequency at which changes are being received, otherwise, if the cache gets full of dirtied pages that have not yet been written out to the storage layer, a page may have to be flushed in order to accept more changes, which introduces latency into the system. By contrast, in the systems described herein, as long as the redo logs for a data page in the cache of the database engine head node have been passed to the distributed storage system (and a write acknowledgement has been received), the database tier may evict the data page (which can be reconstructed by the storage layer at any time) from its cache.

In some embodiments of the systems described herein, crash recovery, flashback, and point in time restore operations may not require the replay of either redo or undo logs. Instead, they may include building an instance (e.g., building a database instance using reserved or contingency resource instances), resetting the current volume LSN to the appropriate commit point, and restarting the database service.

The database systems described herein may in some embodiments be scaled to accommodate larger database tables and/or higher throughput than some existing databases, without suffering some of the disadvantages associated with previous database scaling approaches (e.g., disadvantages in terms of complexity and/or cost). For example, in some embodiments, there may be no practical limit to the volume size, and volumes may be able to grow dynamically without loss of availability or change in performance (e.g., by adding an additional protection group of segments). In addition, assuming write traffic is spread across segments, IOPS may be made virtually unbounded. For example, in some embodiments, IOPS may be increased or decreased without impacting the performance of the currently running database, with any necessary restriping being performed in the background while new writes are forwarded to the storage tier. In such embodiments, query performance may be made predictable and consistent without the need to freeze IO traffic during backup operations or re-mirroring. Instead, the storage tier may manage striping, mirroring and heat management, removing these responsibilities from the database tier or administrator.

As described herein, all writes in the storage tier may be made durable on persistent media before being acknowledged back to the database tier. This may prevent logical corruptions on large-scale power events, and may remove the need to restore from backup, in such cases. In some embodiments, the only time a restore from backup is required may be in response to a customer error (e.g., the accidental deletion of a table, or similar).

In some embodiments, the database systems described above may be implemented by a service provider that offers different types of virtualized computing, storage, and/or other network-accessible functionality to clients (e.g., client applications, customers, or service subscribers). For example, one such service provider may allow customers to reserve, lease, or purchase access to virtualized resources that implement the functionality of the database engine head node, the storage system server nodes, and/or other components of the database systems described above. In some embodiments, the virtualized resources may be implemented as a pool of resource instances (e.g., compute instances, storage instances, and/or other types of resource instances), some of which may be reserved or designated as contingency resources for implementing the services when they are initialized and/or following a failure or detection of another trigger condition on behalf of the clients of the services (e.g., database service clients, storage service clients, or other virtual computing system service clients). In some embodiments, designating contingency resource capacity may involve setting a parameter value indicating the number of resource instances in a pool of available resource instances that make up the contingency resource capacity without identifying any specific resource instances as contingency resource instances. In other embodiments, designating contingency resource capacity may include creating a pool (or sub-pool) of resource instances in which particular ones of the available resource instances are designated as contingency resource instances for a particular service. In such embodiments, designating particular resource instances as contingency resource instances may facilitate the placement of those resource instances in particular placement groups and/or may allow them to be implemented using specific types or classes of hardware or on particular machines.

Figure 12:
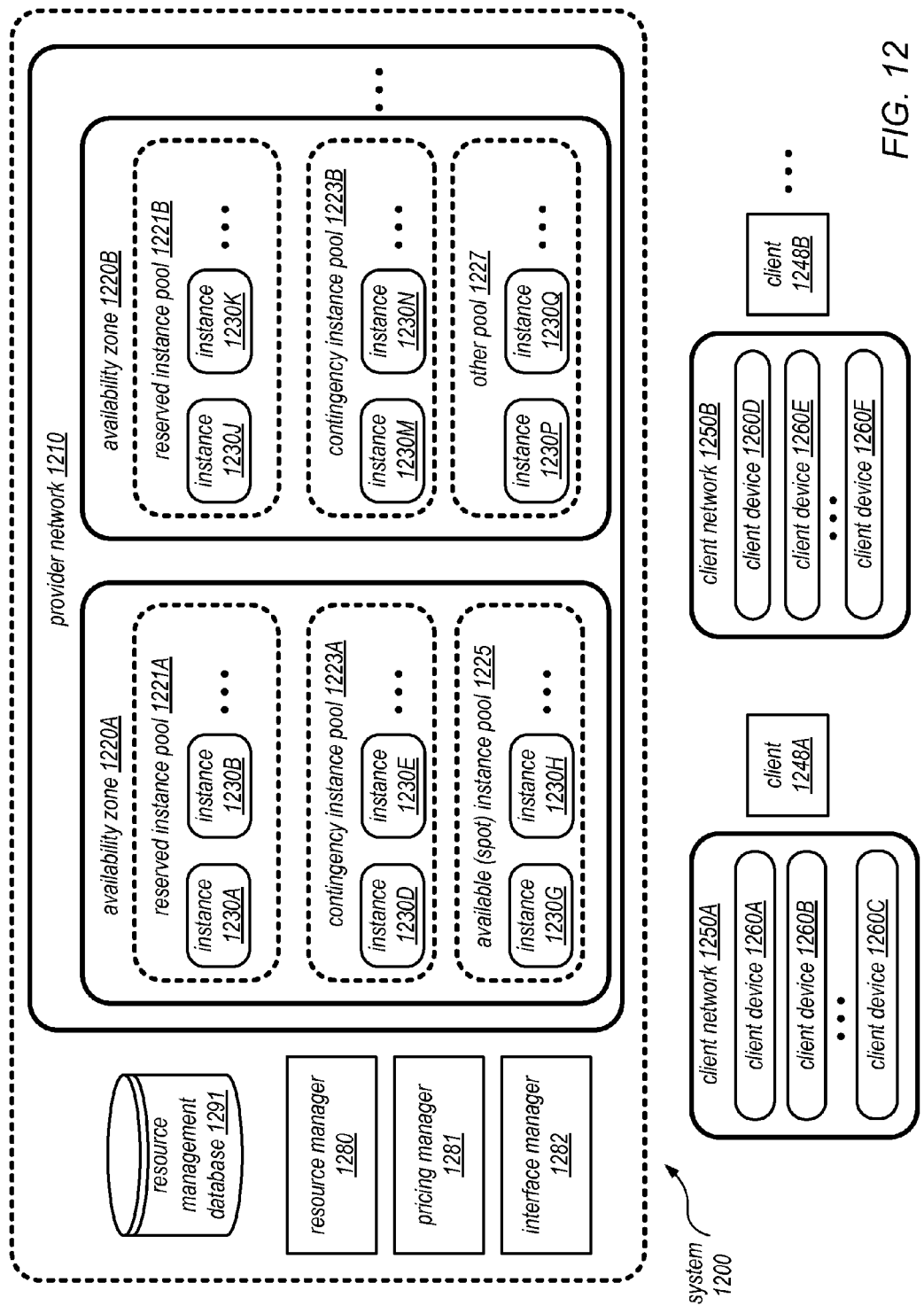
FIG. 12 is a block diagram illustrating one embodiment of a system that is configured to provide network-based services to clients.

One embodiment of a system that is configured to provide network-based services to clients is illustrated by the block diagram in FIG. 12. In this example, the system 1200 includes a provider network 1210 comprising a plurality of resource instances 1230, such as instances 1230A, 1230B, 1230D, 1230E, 1230G and 1230H in one availability zone 1220A, and instances 1230J, 1230K, 1230M, 1230N, 1230P, and 1230Q in a different availability zone 1220B. The various resource instances 1230 in the different availability zones 1220 may be reserved and/or allocated for use by clients (or potential clients) such as client 1248A and 1248B. In the illustrated embodiment, system 1200 includes a resource manager 1280, a pricing manager 1281, and an interface manager 1282. In some embodiments, the functionality of the interface manager 1282 may be implemented by a subcomponent of the resource manager 1280 and/or a subcomponent of the pricing manager 1281. The interface manager 1282 may in some embodiments implement one or more programmatic interfaces allowing clients 1248 (e.g., clients 1248A and 1248B) to search for, browse, reserve and acquire resource instances 1230 to obtain various types of services, e.g., to run and/or access various applications. For example, interface manager 1282 may in some embodiments to configured to communicate with various client devices 1260 (e.g., client devices 1260A, 1260B, and 1260C in client network 1250A, or client devices 1260D, 1260E, and 1260F in client network 1250B), on behalf of clients 1248A and 1248B, respectively.

In the illustrated embodiment, at a given point in time, some or all of the resource instances 1230 may be assigned to resource instance pools, such as reserved instance pools 1221A or 1221B, contingency instance pools 1223A or 1223B, available (spot) instance pool 1225, or one or more other pool(s) 1227. In some embodiments, a given resource instance pool (such as the available instance pool 1225) may contain sub-pools. Each pool (or sub-pool) may have an associated pricing policy for its instances, as well as other properties such as interruptibility settings for the instances that happen to be assigned to the pool or sub-pool. It is noted that the pools may represent logical collections or aggregations, so that, for example, the presence of two instances in the same pool or sub-pool may not necessarily imply anything about the physical location of the hardware used for the two instances. For example, although the instances 1230 illustrated in FIG. 12 are shown as belonging to availability zones 1220, in other embodiments the provider network 1210 may be organized differently (e.g., in some embodiments availability zones may not be implemented). Availability zones 1220 may be grouped into geographic regions (not shown in FIG. 12), in some embodiments. Instance pools may be implemented within availability zones in some embodiments (e.g., each availability zone may have its own reserved instance pool), while in other embodiments an instance pool or sub-pool may span multiple availability zones.

In some embodiments, the pricing manager 1281, which may exist as a separate entity in some embodiments and may be incorporated as an element of the resource manager 1280 in other embodiments, may be configured to determine pricing for the use of various instances 1230, and/or may obtain information (e.g., resource usage records or statistics) from a variety of data sources to generate recommendations on the instances that a client 1248 should acquire or reserve. In some embodiments, the interface manager subcomponents of a pricing manager 1281 (and/or the resource manager 1280) may implement one or more programmatic interfaces to allow clients 1248 to specify one or more preferences and/or optimization goals to serve as additional input for the processes of determining pricing and/or resource instance recommendations. In addition, the pricing and/or recommendations made by the pricing manager 1281 may be dependent on various types of pricing information, such as past pricing trends for different types and sizes of resource instances, pricing constraints specified by clients 1248, anticipated future pricing trends extrapolated or estimated by the pricing manager, and so on. Some or all of the types of information used by the pricing manager 1281 to determine pricing and/or to make its recommendations, and the types of information maintained by the resource manager for resource reservations, allocations and pricing, may be stored in a persistent store such as a resource management database 1291, in some embodiments.

Figure 13:
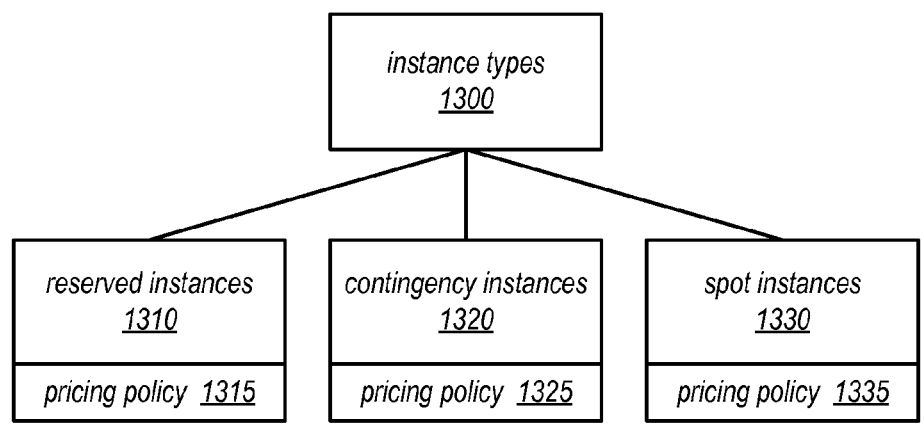
FIG. 13 is a block diagram illustrating an example resource instance classification approach, according to one embodiment.

The resource instances 1230 of a provider network may be grouped into classes or categories based on several different dimensions in some embodiments, and the pricing policies associated with different classes may differ. FIG. 13 illustrates an example resource instance classification approach in which instances are classified based (at least in part) on the timing and/or duration of instance allocations, e.g., on when instances are requested by clients (or dedicated for the use of clients) and when they are released or otherwise re-allocated. Three high-level types 1300 of resource instances are shown in FIG. 13: reserved instances 1310, contingency instances 1320, and spot instances 1330, each with respective pricing policies 1315, 1325 and 1335. In other embodiments, the provider network may employ more, fewer, or different classifications for resource instances (which may include on-demand instances, not shown). In one embodiment, a client may reserve an instance for a fairly long time period (e.g., a one-year term or a three-year term) in accordance with the pricing policy 1315, by paying a low, one-time, upfront payment for the instance, and then paying a low hourly rate for actual use of the instance at any desired times during the term of the reservation. Thus, the client may, by making the long-term reservation, be assured that its reserved instance 1310 will be available whenever it is needed.

In some embodiments, if a client does not wish to make a long-term reservation, the client may instead opt to use spot instances 1330. For example, the spot pricing policy 1335 may allow a client to specify the maximum hourly price that the client is willing to pay, and the resource manager 1280 may set a spot price for a given set of resource instances (spot instances 1330) dynamically based on the prices clients are willing to pay and on the number of instances available to support the spot model. In this example, if a client's bid meets or exceeds the current spot price, an instance 1330 may be allocated to the client. If the spot price rises beyond the bid of the client using a spot instance 1330 (e.g., if the client is outbid for that instance), access to the instance by the client may be revoked (e.g., the instance may be shut down, and may be reallocated for the use of another client).

In some embodiments, clients who request web-based services may specify that at least some of the resource instances for implementing a given service (e.g., for storing copies of data or metadata) be deployed across multiple storage devices, machines, computing nodes, and/or availability zones (e.g., for durability and/or availability), or may explicitly request that redundant resource instance capacity be made available to the given service in case of a failure or to support anticipated growth or scaling. In response, the resource manager 1280 may designate contingency resource instance capacity (but not reserve it for the exclusive use of the given service) in the same availability zone(s) or in one or more availability zones other than those in which reserved instance capacity is implemented for the given service. In such embodiments, pricing (e.g., per instance) for designating resource instances as contingency resource instances may be lower than pricing (per instance) for reserving resource instances as primary instance capacity (e.g., it may be priced at 50%-70% of the rate for equivalent reserved instance capacity, in some embodiments), according to a contingency resource instance pricing policy 1325. In some embodiments, the service provider may attempt to supplement the revenue generated from these contingency resource instances (e.g., to recoup some of the cost of maintaining these resource instances on behalf of a client while not collecting as much money for them as for reserved resources) by offering at least a portion of the contingency resource instance capacity on the spot market.

In the case that any of the contingency resource instances are leased on the spot market, they may be subject to the same pricing policy as that applied to other spot resource instances (e.g., spot instance pricing policy 1335) or may be subject to a different spot instance pricing policy (e.g., one specified as part of contingency resource instance pricing policy 1325). In some embodiments, contingency resource instances may be leased with the understanding that the leases are interruptible. In other words, any leases for contingency resources obtained on the spot market may be revoked at any time if they are needed (for any of a variety of reasons) for the use of a service on whose behalf they were designated as contingency resources, or may be revoked in response to the spot price rising beyond the bid of the client who has leased them. In various embodiments, contingency resource instances that are activated or instantiated for the use of the services on whose behalf they were so designated may be subject to the same pricing policy as that applied to the resource instances that were originally reserved for those services (e.g., reserved instance pricing policy 1315) or may be subject to a different reserved instance pricing policy (e.g., one specified as part of contingency resource instance pricing policy 1325). In some embodiments, contingency instance pricing policy 1325 may specify pricing for designating resource instances as contingency resource instances, pricing for activating those contingency resource instances by the services on whose behalf they are so designated (e.g., when activating them as additional resource instance capacity and/or as replacement resource instance capacity), and/or a minimum bid price at which they may be leased on the spot market.

The prices of reserved instances 1310, contingency instances 1320, and spot instances 1335 may also vary based on the availability zones 1220 and/or geographic regions in which the instances are located. For example, the operator of provider network 1210 may have had to pay different costs for setting up data centers in different physical locations, and may have to pay varying location-dependent ongoing costs for infrastructure and maintenance services such as network connectivity, cooling and so on, which may result in different pricing policies for different availability zones and/or regions. Fluctuations in supply and demand may also result in time-varying prices for the different types of instances. In some embodiments, the price for a given long-term reservation may typically remain unchanged once a client completes the reservation. In some embodiments, pricing for reserved instances 1310, contingency instances 1320, and/or spot instances 1335 may also vary based on expected and/or actual uptime ratios. The uptime ratio of a particular instance may be defined as the ratio of the amount of time the instance is activated to the total amount of time for which the instance is reserved.

Instance pricing may also vary based on other factors, in different embodiments. For example, in the case of compute instances, the performance capacities of different CPUs and other components of compute servers such as memory size may affect the pricing for use of the compute instances. In some embodiments, software features such as operating systems, hypervisors, middleware stacks and the like may also be taken into account in determining the pricing policies associated with various instances. For both compute instances and storage instances, storage device characteristics such as total storage capacity, supported I/O rates and the like may be used to develop pricing policies in some implementations. Pricing policies may also be dependent on networking capabilities and networking usage (e.g., number of megabytes of data transferred, and/or the distances over which network traffic is transmitted). The various pricing policies, including static and dynamic components of pricing, as well as location-dependent and location-independent components, may be used by pricing manager 1281 to set prices and/or to make its recommendations. Some or all of the pricing information may be stored in resource management database 1291, and the pricing manager 1281 may retrieve the information from the database as needed. In some embodiments, the resource instances of a provider network may be organized as pools based on, for example, which instances are currently being used as spot instances (e.g., instances in pool 1225 of FIG. 12), which instances are reserved (e.g., instances in pools 1221A and 1221B), which instances are designated as contingency instances (e.g., instances in pools 1223A and 1223B), and so on.

Figure 14:
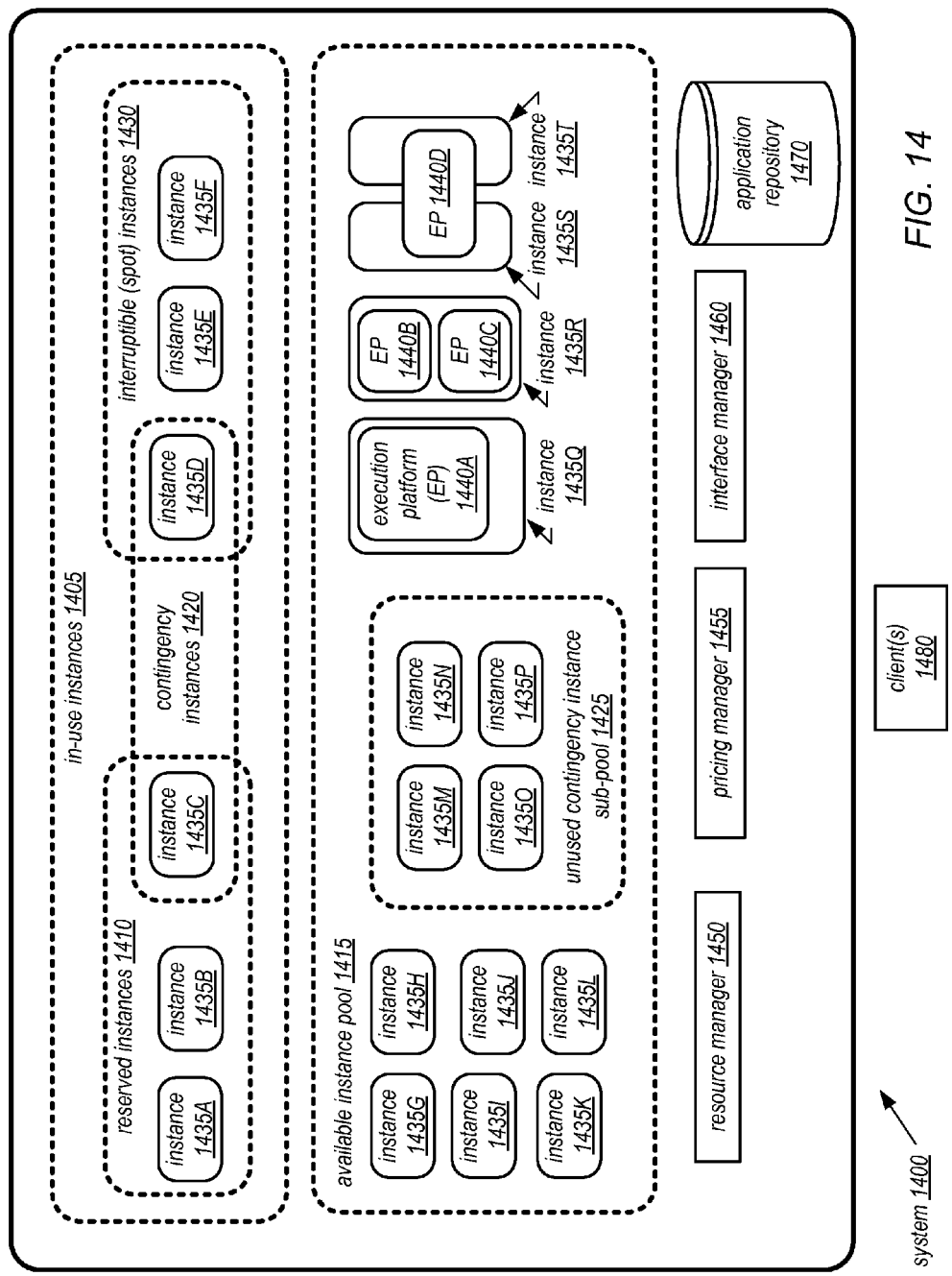
FIG. 14 is a block diagram illustrating one embodiment of a system that is configured to fulfill resource instance requests using reserved, contingency, and/or interruptible (spot) resource instances.

One embodiment of a system that is configured to fulfill resource instance requests using reserved, contingency, and/or interruptible (spot) resource instances is illustrated by the block diagram in FIG. 14. FIG. 14 illustrates an embodiment in which a resource manager 1450 may fulfill requirements for the use of various resource instances (e.g., virtual compute resource instances, storage resource instances, database instances, etc.). In the illustrated embodiment, system 1400 includes a plurality of instances 1435, each of which is assigned to an instance pool. As shown in the example illustrated in FIG. 14, instances 1435 that are currently active (e.g., accessible via the network, performing functions, running applications, and/or providing services to various clients 1480), which may be referred to as in-use instances 1405, may include instances in several sub-pools, including a reserved instances pool 1410, a contingency instance pool 1420, and one or more interruptible (or spot) instance pool(s) 1430. In the illustrated example, reserved instance pool 1410 includes (at least) instances 1435A and 1435B, which are reserved for the exclusive use of a particular service, process, client and/or application.

In this example, contingency instance pool 1420 includes (at least) instances 1435C and 1435D. In this example, contingency instance 1435C has been placed in reserved instance pool 1410 and activated for the use of a particular service, process, client and/or application on whose behalf one or more resource instances were designated as contingency resource instances (e.g., in response to a node-specific or AZ-wide failure, to support increased scaling of the service, to improve performance, to replace one or more reserved resource instances involved in a maintenance operation, or in response to another trigger condition warranting the activation of the contingency resources instance being met). In this example, resource instance 1435D has been placed in interruptible (spot) instance pool 1430 and provided to a service, process, client and/or application other than one on whose behalf resource instances were designated as contingency resource instances on the spot market (e.g., through an interruptible lease). In other words, the lease on resource instance 1435D may be revoked at any time and may be placed in reserve instance pool 1410 for the use of a service, process, client and/or application on whose behalf one or more resource instances were designated as contingency resource instances (e.g., in response to a node-specific or AZ-wide failure, to support increased scaling of the service, to improve performance, to replace one or more reserved resource instances involved in a maintenance operation, or in response to detection of another trigger condition). This is illustrated in FIG. 14 by the overlaps between the borders of reserved instance pool 1410, contingency instance pool 1420, and interruptible (spot) instance pool 1430. In this example, interruptible (spot) instance pool 1430 also includes (at least) instances 1435E and 1435F. While these resource instances may not have been designated as contingency resources for any particular services, processes, clients and/or applications, in some embodiments they be leased using an interruptible lease that can be revoked by the resource manager 1450 at any time (e.g., for the use of higher priority services/processes/ clients/applications), according to any of a variety of applicable resource management policies.

In this example, instances that are currently not in use may be assigned to an available instance pool 1415. A subset of the instances of the available instance pool 1415 (e.g., instances 1435M-1435P) may be assigned to one or more sub-pools of unused contingency resource instances, such as unused contingency instance sub-pool 1425. Other unused instances (e.g., instances 1435G-1435L) may be generally available for use (e.g., through a spot market or on-demand). In some embodiments, instances may be moved in and out of the various pools and sub-pools illustrated in FIG. 14 in response to actual and/or anticipated supply and demand (e.g., for load or heat balancing purposes) or to otherwise improve performance of a service (e.g., by implementing one or more components of the service using different computing nodes, underlying hardware, or other higher-performance resources), in addition to being moved in response to a node-specific or AZ-wide failure, to support increased scaling of the service, to improve performance, to replace one or more reserved resource instances involved in a maintenance operation, or in response to another trigger condition warranting the activation of the contingency resources instance being met. In some embodiments, resource instances may be moved from the reserved instance pool 1410 to the usused contingency instance sub-pool 1425 following the failure of a computing node on which the resource instance was implemented (e.g., in the case that a resource instance that was temporarily unreachable has been replaced by a corresponding contingency resource instance).

As illustrated in this example, system 1400 may also include a pricing manager 1455. The pricing manager 1455 may be configured to determine pricing for the use of various instances 1435 and/or to generate recommendations of instances to be used by clients 1480. As in the previous example, a resource management database (not shown) may be used to store various types of instance information, including pricing information, performance capacity information, usage records, and/or interruptibility settings of various resources. It is noted that although availability zones are not shown explicitly in FIG. 14, each of the instances shown may in some embodiments belong to an availability zone and/or a geographic region of a provider network. For example, all the instances 1435 shown in FIG. 14 may belong to the same availability zone, or sub-sets of these instances may belong to different availability zones, in different embodiments.

As described earlier, clients 1480 may in some embodiments reserve resource instances for agreed-upon reservation periods such as one-year terms or three-year terms. When a client 1480 makes such a reservation, the resource manager 1450 may be committed to provide access to a resource instance with the specified performance capability and other characteristics, whenever the client requests such access during the term of the reservation. In some embodiments, a client may be able to request that redundant instance capacity be maintained (or made available in case of a node-specific or AZ-wide failure) in two or more availability zones on behalf of the client (e.g., resource instance capacity that may take over in the case of a failure). In some such embodiments, one or more resource instances in one or more availability zones may be reserved for the use of a client 1480 (e.g., reserved instances 1435A or 1435B in reserved instance pool 1410). Additional resource instances (e.g., resource instances in the same or other availability zones) may be designated as contingency instances that are to be activated for the use of the client only if and when they are needed (e.g., to replace reserved resource instances in the case of a failover condition or while performing maintenance operations on one or more nodes on which the reserved resource instances are implemented, to replace or supplement reserved resource instances to improve performance or to support additional scaling, or in response to one or more other trigger conditions being met).

In the example illustrated in FIG. 14, instances 1435M-1435P (in unused contingency instance sub-pool 1425) may be resource instances that have been designated as contingency resources, but that have not yet been activated, while instances 1435C and 1435D may be resource instances were designated as contingency resources, and that have been activated in response to any of a variety of trigger conditions being met. As described herein, in some embodiments, resource instances in the unused contingency instance sub-pool 1425 may be offered to clients 1480 on the spot market through interruptible leases, but these leases may be revoked at any time by the resource manager 1450.

In some embodiments, the pricing for interruptible (spot) instances (e.g., instances in the interruptible instances pool 1430 and/or any contingency instances within contingency instance pool 1420 that have been leased to various clients on the spot market) may vary over time, depending for example on the relative demand for and supply of available instances. For example, when a client submits an acceptable instance acquisition request for such an instance (e.g., if the client's bid for the instance meets the current price for such instances), an instance of the requested type may be allocated to the client, and the instance may be assigned to the in-use interruptible instance pool 1430. The total number of available spot instances to be kept either as in reserve in the available instance pool 1415, or in the in-use instance pools 1430, may be determined by the resource manager 1450, and may be based (at least in part) on the number of reserved instances, contingency instances and spot instances that are in use at any given time, the actual or anticipated rate of requests for resource instances, or other factors. In the embodiment illustrated in FIG. 14, the resource manager 1450 may maintain a buffer of instances in the available instance pool 1415 specifically to meet current and/or anticipated instance requests.

In some embodiments, interruptible (spot) instances may allow clients to save the state of applications and/or complete some critical work before these instances are interrupted or stopped. For example, in one embodiment, the resource manager 1450 may support an interruptibility setting that gives a client a five-minute or thirty minute advance warning before access to an interruptible (spot) instance is revoked. In other embodiments (or for particular instances, such as contingency instances 1420 that have been leased to a client on the spot market while they are not needed by the clients on whose behalf they were designated as contingency resources), leases for interruptible (spot) instances may be revoked at any time and/or without warning. In some embodiments, the pricing for instances that are interruptible without warning may be different (e.g., lower) than the pricing for instances that are interruptible following a warning, and the length of the warning period provided may vary at the granularity of a minute based on the price the client is willing to pay, such that clients willing to pay one amount may receive a five minute warning, while clients willing to pay slightly more may receive ten minute warnings, and so on. In some implementations, the current spot instance pricing rate may be set by the pricing manager 1455 based (at least in part) on the current size of various interruptible instance sub-pool(s), and/or on the total size of the available instance pool 1415. Spot pricing may also be dependent on the expected rate of requests for spot instances, the expected rate of instance upgrade requests (e.g., requests to upgrade an instance from interruptible to reserved), actual usage records, and/or other metrics.

As illustrated in this example, an interface manager 1460 may be responsible for implementing functionality related to various programmatic interfaces supporting interactions with the resource manager 1450 and/or pricing manager 1455, in some embodiments. In some embodiments, resource manager 1450 may be configured to move instances in and out of various pools or sub-pools (e.g., from the available instance pool 1415 to the unused contingency instance sub-pool 1425 or to the spot instance sub-pool 1430 or reserved instance pool 1410 of the in-use instance pool 1405, from one of these pools back to the available instance pool 1415, or from the reserved instance pool 1410 of the in-use instance pool 1405 to the unused contingency instance sub-pool 1425) based on current and/or projected supply and demand or in response to various trigger conditions being met. The relative pricing for the resource instances may vary based on supply and demand and on the instance pools in which each of the resource instances are assigned at any given time. For example, if the rate of requests for spot resource instances increases, in some embodiments the price and/or number of instances in the spot instance sub-pool 1430 may be increased accordingly, as long as the resource manager 1450 is still able to maintain the available resource instances 1415 needed for any outstanding reservations (including any contingency resource instances that would be needed in the case of a contingency trigger condition being met). The resource manager 1450 may thus be configured to balance a number of potentially competing demands when deciding how to size the various pools and sub-pools in some embodiments. In some cases, the same client 1480 may wish to utilize different types of pricing models and/or interruptibility settings for different subsets of the client's application set—e.g., such a client may use (or request the use of) any combination of reserved instances, contingency instances, and/or spot instances at various times and for various purposes.

In some embodiments, the resource manager 1450 may also support upgrades and/or downgrades of the instances allocated to a client 1480. E.g., a client 1480 may be willing to pay a baseline pricing rate for a given instance for a period of time during which the instance is interruptible (e.g., according to an interruptible-with-warning or interruptible-without-warning setting) and may be interested in upgrading the instance to reserved instance setting for an additional price for some period of time. Interruptibility downgrades (e.g., from a reserved instance setting to an interruptible instance setting or from an interruptible-with-warning setting to an interruptible-without-warning setting) may also be supported in some embodiments, and may be associated with a corresponding reduction in price. In general, in some embodiments, the billing amount charged to a client may be based at least in part on the pricing rates in effect for the different levels of interruptibility of an instance while it was allocated to the client and/or the respective durations for which the instance's interruptibility was set to each of the levels. For example, if a client 1480 used an instance 1435 at interruptibility level I1 for a time period T1 during which the instance pricing for level I1 was P1, and the client used that same instance at interruptibility level I2 for a time period T2 during which the instance pricing for level I2 was P2, the billing amounts charged to the client for that instance may be based at least in part on the sum of the products (T1*P1)+(T2*P2).

In some embodiments and for certain kinds of client applications, it may be beneficial to manage and schedule resources at other granularities in addition to, or instead of, entire resource instances. For example, in some embodiments, the resource manager 1450 may be configured to determine a dynamically varying price per execution unit (expressed for example in units such as CPU-seconds, CPU-minutes, CPU-hours, MegaFLOPs, Megahertz, Gigahertz and the like) of excess resource capacity, and use the price to select client-provided applications for execution, according to at least some embodiments. A client 1480 may provide one or more application packages to the resource manager 1450, e.g., with the help of a programmatic interface such as an API or a one or more web pages implemented by interface manager 1460, where each application package includes an executable object and has an associated pricing constraint to be used to schedule the execution of the executable object. For example, a client may provide an executable object that can be deployed and run on a JVM that is compliant with a specified version of the Java™ Development Kit (JDK), a platform that supports various interpreted or compiled programming languages such as Ruby, Python, Perl, C, C++ and the like, or on a high-performance computing execution platform that conforms to one or more industry standards. The client 1480 may indicate, as a pricing constraint, that it is willing to pay up to specified amount for each CPU-minute that the executable is run on an execution platform with a specified performance capacity (e.g., on a JDK 1.6 JVM running on CPU X at 3 GHz or higher clock rate). The application packages provided by clients may be stored in an application repository 1470, in some embodiments. Various other details regarding the application may also be specified by the client via the application package, such as input/output needs of the application; further details of application package contents are provided below.

In the illustrated embodiment, a subset of available instances (such as instances 1435Q, 1435R, 1435S and 1435T) may represent excess resource capacity that is usable for the use of various application packages. The resource manager 1450 may instantiate a number of execution platforms (EPs) 1440 on these instances, as needed, to satisfy the execution requests for the application packages provided by the clients. For example, an EP 1140A may be instantiated on instance 1435Q, two EPs 1440B and 1140C may be instantiated on instance 1435R, and one EP 1440D may span multiple instances, such as 1435S and 1435T. In various embodiments, an execution platform may comprise any of a variety of middleware entities or software collections that may be needed for execution of client applications, such as JVMs, application server instances, database instances, special-purpose or general-purpose operating systems, high-performance computing platforms such as genome analysis platforms, simulation test beds, map-reduce execution environments, and the like.

As illustrated in this example, a flexible mapping of execution platforms to the excess resource capacity of a provider network may be implemented, in some embodiments, such that a single EP 1440 may be instantiated on one resource instance 1435, multiple EPs 1440 may be instantiated on one resource instance 1435, or a single EP 1440 may be instantiated on multiple resource instances 1435. In some embodiments, e.g., where a resource instance 1435 typically comprises a virtual compute platform that relies on a hypervisor running on some "bare-metal" hardware asset, some of the bare-metal hardware assets may be used for the excess resource capacity without instantiating hypervisors or other components typically used for resource instances. Pricing per execution unit (e.g., per CPU-minute) for different types of EPs may vary dynamically in some embodiments, based on factors such as the supply and demand for such EPs, the performance capabilities of the EPs, the requirements of the resource manager to maintain available instances to support unfulfilled reservation slots, and so on.

In some embodiments, the resource manager 1450 may attempt to find a "best match" execution platform for various application packages using one or more criteria. For example, in one embodiment, the resource manager 1450 may select a particular EP 1440 on which to schedule execution of the executable object of an application package based at least in part on the current pricing of execution units of the EP 1440 and the pricing constraints of the application package (e.g., the maximum price the client is willing to pay). If a match is found, execution of the client's application may be started (or resumed) on the selected EP 1440.

Figure 15:
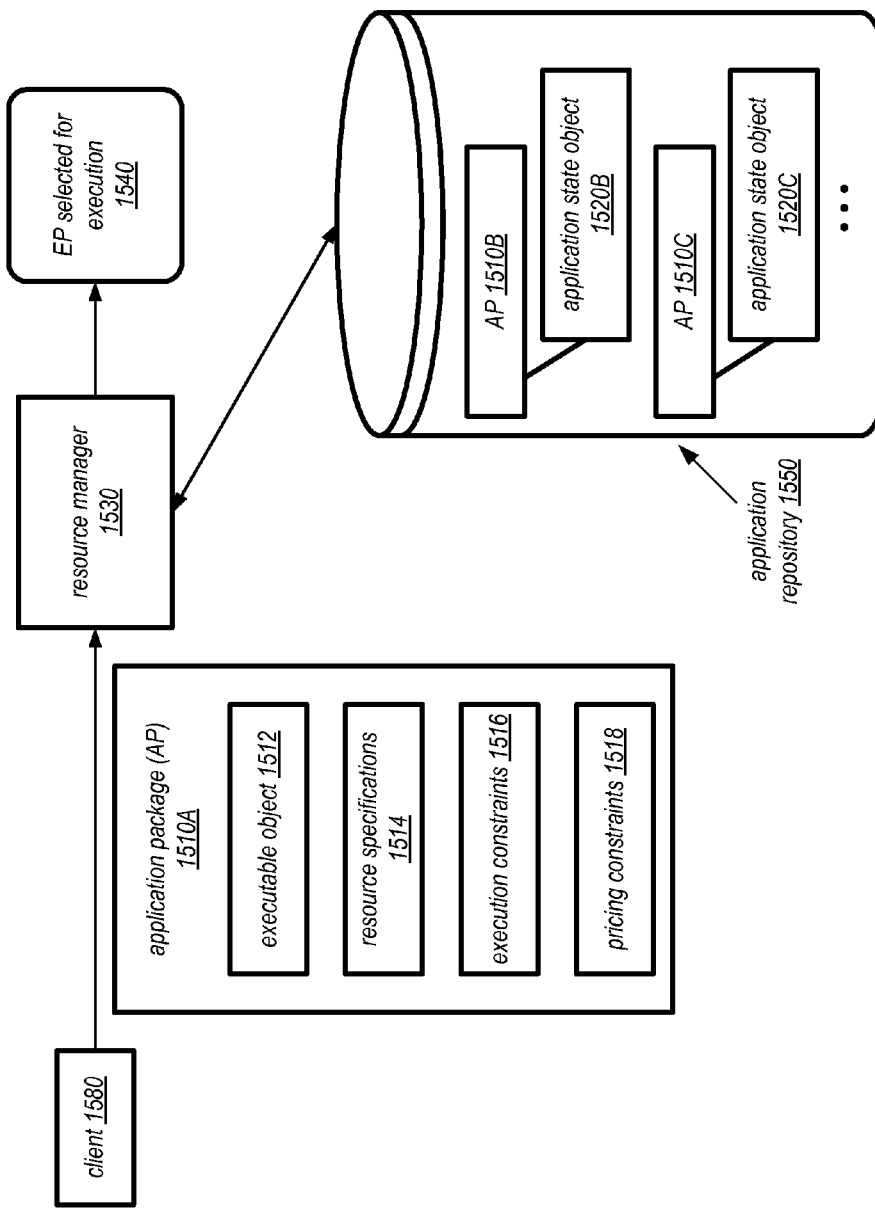
FIG. 15 is a block diagram illustrating an example application package that may be submitted by a client to a resource manager, according to one embodiment.

FIG. 15 is a block diagram illustrating an example application package that may be submitted by a client to a resource manager of a network-based service provider, according to one embodiment. More specifically, FIG. 15 illustrates example contents of an application package that may be submitted by a client 1580 to a resource manager 1530. As illustrated in this example, an application package (AP) 1510A may include an executable object 1512, such as a jar (Java™ archive) file, a war (web application archive) file, an ear (enterprise archive) file, an exe file, one or more scripts written in any appropriate language such as Python, Ruby, Perl, any of various variants of SQL, shell scripts, and the like. In one implementation supporting parallel or multi-threaded application types, the executable object 1512 may comprise one thread (or multiple threads) of a multi-threaded or parallel application. For example, several application packages 1510 may be created for a single multi-threaded application, such that each package 1510 specifies a subset of the complete set of threads of the application as the package's executable object 1512. In some embodiments the AP 1510A may include a set of preferred or required resource specifications 1514, such as a minimum CPU speed, CPU vendor or architecture details, minimum main memory requirements, an operating system version, application server version, database management system vendor and version, and so on. Some of the resource specifications may be labeled as mandatory, i.e., the resource manager 1530 may be unable to execute the application if the mandatory requirements are not met. Non-mandatory resource specifications may serve as hints or advisories to the resource manager; e.g., the resource manager may in some implementations make a best effort to find execution platforms that meet non-mandatory specifications.

Some types of applications may have dependencies or constraints—for example, one application may rely on an external web site being available, or may perform better when an external web site is available. Another application may be configured to obtain work tasks or jobs from an external job queue, such that if the job queue is empty or unreachable the application may not be able to perform much useful work. As illustrated in this example, AP 1510A may contain indications of such execution constraints 1516, in some embodiments. A client 1580 may include pricing constraints 1518 in the application package itself in some embodiments (e.g., the maximum price the client is willing to pay per CPU-minute or per some other execution unit). In some embodiments, the client may specify pricing constraints for completing execution of the application, instead of or in addition to specifying the client's bid per execution unit. Pricing constraints associated with an application package may be specified and/or stored separately from other contents of the application package in some embodiments, e.g., an application package may not include the pricing constraints in some cases. A client 1580 may in some implementations update the bid or other details of the pricing constraints 1518 as needed during the lifetime of the application. For example, if an application is suspended or stopped because the prevailing price for using the application platform it needs has risen beyond the price bid by the client originally, the client may be allowed to raise the bid; and if the client wishes to lower costs for some reasons, the client may be allowed to lower the bid for one or more of the client's application packages.

When resource manager 1580 receives an application package 1510, in some embodiments it may store the package in a persistent application repository 1550. If a suitable execution platform can be found for the application submitted by the client, the execution of the application on that selected EP (e.g., EP 1540) may be initiated. In some embodiments, the application package 1510 may only be stored if an EP cannot immediately be found for it, i.e., an application package 1510 (such as AP 1510B or AP 1510C) may be stored in the application repository 1550 only when and if the execution of the application cannot proceed. In some embodiments, the resource manager 1530 may also store a persistent application state object (ASO) 1520 (such as a serialized Java™ object file, or any other object representation of the state of an application that allows the resumption of the application when a suitable execution platform become available) for each application object 1510 (e.g., ASO 1520B for application package 1510B, ASO 1520C for application package 1510C, and so on). For applications whose execution has not yet begun, the corresponding state representation object 1520 may be empty. Other information not shown in FIG. 15 may be included in application packages 1510 and/or in application repository 1550 in some embodiments. For example, one or more representation of execution metrics (e.g., how many CPU-minutes of execution have been completed so far for the application), execution history (on which specific execution platforms the application has been executed), and the like may be stored in application repository 1550, in some embodiments. In some embodiments, security constraints may also be associated with each application package 1510 (e.g., the client 1580 may encrypt portions of the application package and/or use a digital signature on portions of the application package). In such embodiments, the resource manager 1530 and the client 1580 may need to transfer or exchange one or more keys to implement the security mechanism being used.

As previously noted, in some embodiments of the database systems described herein (e.g., those that include a single database engine head node in a database tier and a plurality of storage nodes in a separate distributed database-optimized storage system), replication operations may involve moving redo log records, and not data blocks. Therefore, the performance impact of replication may be lower than in other database systems. In addition, in such systems, coordination of writes across availability zones may be performed at the storage tier and may not require the use of a reserved (standby) resource instances (e.g., resource instances implementing additional database engine head node) for synchronous replication, which may reduce costs when compared with existing database systems. For example, in some existing database systems, database tier functions are physically replicated on the multiple machines, which may be the same machines (or at least machines in the same availability zones) as those on which storage node server functionality for the database system is implemented (e.g., to manage data replication, as part of their normal configuration and operation), which may allow them to quickly recover from a node-specific or AZ-wide failure. In some existing distributed database systems, only a portion of the replicated database tier functionality that is provisioned (and reserved) in secondary AZs may actually be used in the secondary AZs during normal operation. For example, the replicated database tier components may receive write requests and write data to various storage devices, but may not perform the other control functions of the given database until or unless the replicated database tier components take over these control functions from the corresponding components in another AZ as part of a failover operation.

In some embodiments, however, the database systems described herein may not require dedicated local resources in every AZ for interface and control functions (e.g., the control plane of the database system) during normal operation (e.g., while the database engine head node is active, the system is meeting performance expectations, etc.). Therefore, in some embodiments, rather than provisioning enough standby resource instance capacity to implement an additional database engine head node for a given database instance in one or more AZs other than the one in which the database engine head node is implemented, the service provider may designate that amount of resource instance capacity in those AZs as contingency resource capacity for the given database instance, but may allow that contingency resource capacity to be leased to other services, clients, processes, or applications until and unless it is needed to implement an additional or replacement database engine head node for the given database.

In embodiments in which a client (e.g., a customer or subscriber who has requested database services) has specified that a given database be deployed across multiple availability zones, the service provider may provision (and may reserve) resource instances for storage system server nodes (and corresponding storage devices) in multiple availability zones, but may only provision resource instance capacity for a database engine head node in one of those availability zones (or machines therein). The service provider may designate additional resource instance capacity as contingency resource capacity for the given database, but that resource capacity may not be reserved or activated for its use (e.g., by instantiating another database engine head node) unless it is needed due to a node-specific or AZ-wide failure, to support increased scaling of the service, to improve performance, to replace one or more reserved resource instances involved in a maintenance operation, or in response to detection of or another trigger condition. Instead, while the database engine head node implemented by the active, provisioned (and, in many cases, reserved) resource instance capacity is operating normally (e.g., within its expected or desired performance targets), it (or more specifically, the client side driver of the database engine head node) may handle sending redo log records to the storage system server nodes in all of the AZs. For example, in response to receiving write requests, the database engine head node may pass information about those requests (e.g., redo log records) to the client side driver, and the client side driver may take responsibility for passing the redo log records to both local storage system server nodes that comprise the targeted volume (e.g., storage system nodes in the same AZ) and any storage system server nodes that comprise the targeted volume and that exist in another AZ, where all of those storage system server nodes form (at least part of) a protection group for that segment of data. In such systems, there may be no need to provision, instantiate and/or activate a database engine head node in the other AZs, because the client side driver on the source database node communicates with all of the storage system server nodes regardless of whether they are in the same AZ as the client side driver or in other AZs.

As previously described, in some embodiments, in order to generate revenue using what would otherwise be largely unused excess resource instance capacity, the systems described herein may be configured to offer at least a portion of the contingency instance capacity in a given AZ (e.g., an AZ that serves as a secondary AZ for a given database) on the spot market.

In some embodiments, in the case of a failure of the computing node on which the database engine head node for a given database is implemented a computing node on which the database engine head node for a given database (or an AZ-wide failure affecting the a computing node on which the database engine head node is implemented) for the given database, a failover process may be initiated in order to rebuild and restart the given database. In some embodiments, this failover process may include a resource manager component of the provider of the database service revoking the leases of one or more resource instances in another AZ that were designated as contingency resources for the given database, but that have since been leased to another entity on the spot market. In this example, the other AZ may include all of the same data volumes that were maintained on behalf of the given database in the primary AZ (e.g., these volumes may have been replicated on storage system server nodes and corresponding storage devices in the other AZ, as described herein). Therefore, in response to the failover of the given database, a new database engine head node may be instantiated using the contingency resource instance capacity on the other AZ, and, once activated, that new database engine head node may immediately have access to all of the data that was committed to those data volumes prior to the failover.

In some embodiments, a control plane function of the database system (or the provider of the database service) may monitor the activities of the database system (e.g., periodically or in response to a detected error condition) to determine whether (at any given time) the database engine head node is reachable. If not, the control plane function (or service provider) may attempt to provision a new database engine head node and provide a mechanism to direct new requests targeting the corresponding database to the new database engine head node. The new database engine head node may then attempt to connect to the volume on which the target data is located, and the storage system volume may attempt to open all of the storage system server nodes on which the data is (or was) located. If some of the storage system server nodes have failed or are otherwise unreachable, those storage system server nodes may be fenced out of the volume (at least temporarily) so that requests are not directed to those nodes. If the fenced out nodes subsequently recover or become reachable, the storage system may be configured to restore them to the current state of the other replicas of that data. Note that in some embodiments, a similar failover process may be performed within a single AZ. For example, if additional resource instance capacity (e.g., either contingency resource capacity or other unused/undesignated resource instance capacity) is available within the same AZ (e.g., if the failure of the computing node on which the database engine head node was implemented is not an AZ-wide failure), the control plane of the database system (or service provider) may be configured to instantiate another database engine head node on another computing node within the same AZ and attach the new database engine head node to the new database engine head node, after which the failover process may be similar to that described above for the multiple-AZ case.

Figure 16:
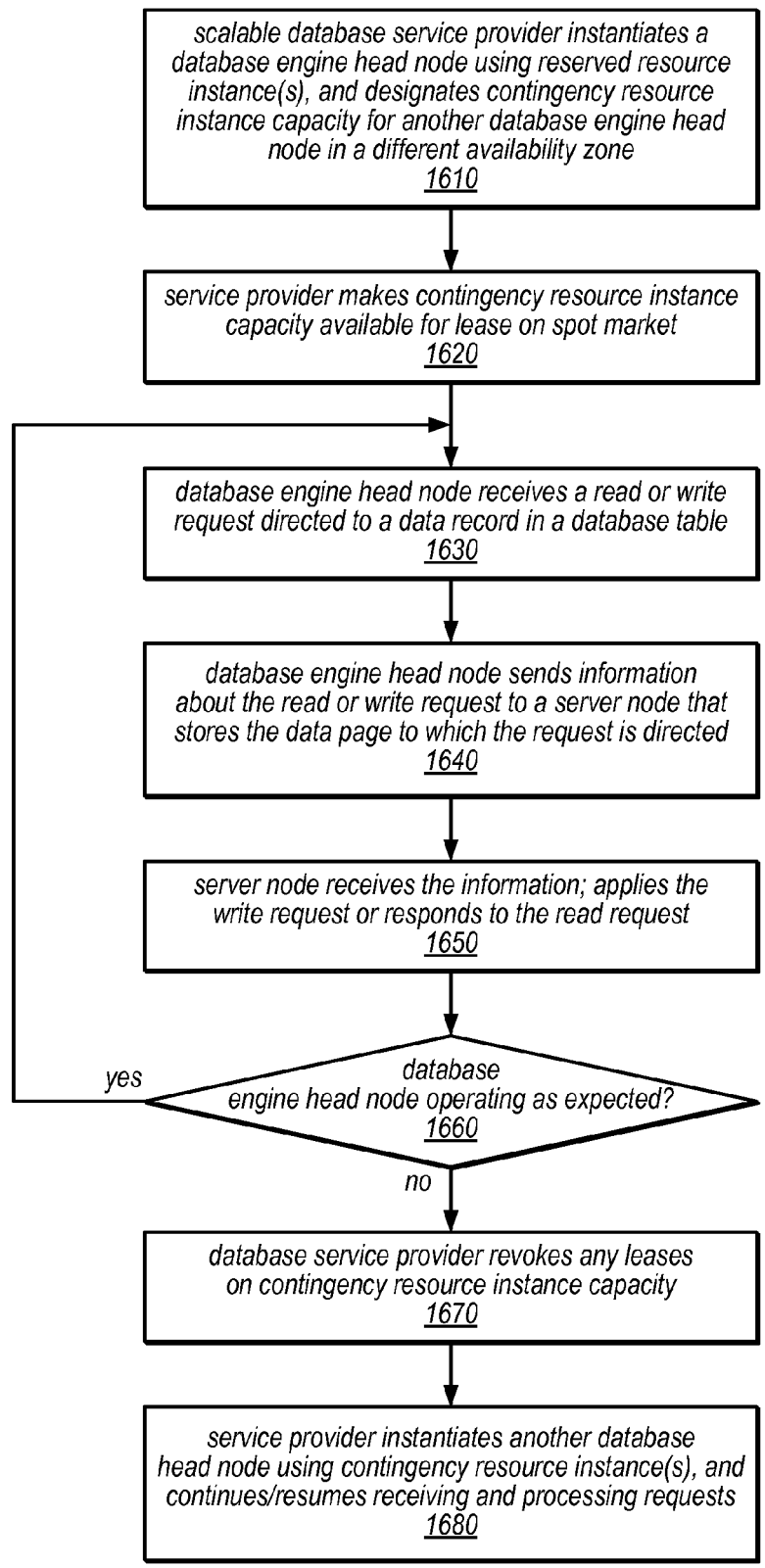
FIG. 16 is a flow diagram illustrating one embodiment of a method for managing contingency resource instance capacity by a scalable database service provider.

One embodiment of a method for managing contingency resource instance capacity by a scalable database service provider is illustrated by the flow diagram in FIG. 16. As illustrated at 1610, in this example, the method may include a scalable database service provider instantiating a database engine head node for a given database table using one or more reserved resource instance(s), and designating contingency resource instance capacity (enough to be able to instantiate another database engine head node) in a different availability zone. In some embodiments, the service provider may also provision resource instances for instantiating storage system server nodes in one or more availability zones (not shown). The method may include the service provider making at least some of the contingency resource instance capacity available for lease on spot market, as in 1620. In other words, other services, clients, applications, or processes may be granted interruptible leases for contingency resource instances while they are not needed to provide the database services for which they were designated as contingency resource instances. After the resource instances that implement the given database table are activated, the system may begin receiving and processing query requests that are directed to the database table (including read and write requests).

As illustrated in this example, the method may include the database engine head node receiving a read or write request directed to a data record in a database table, as in 1630. The database engine head node may then send information about the read or write request (e.g., a read query or a redo log record) to a storage system server node that stores the data page to which the request is directed, as in 1640. The method may include the server node receiving the information and then applying the write request or responding to the read request, as in 1650. As described in detail herein, in various embodiments, applying a write request may include (at some point) coalescing multiple redo log records to generate a current version of the targeted data page, and responding to a read request may include returning requested data (which may also include coalescing multiple redo log records to generate a current version of the targeted data page prior to returning the requested data).

As illustrated in this example, if the database engine head node is operating as expected, shown as the positive exit from 1660, the method may include repeating the operations illustrated as 1630-1650 to receive and process one or more additional read or write requests. For example, while the database engine head node is active, and the performance of the system is acceptable (e.g., if it is meeting performance expectations with or without additional scaling), there may be no need to activate any of the contingency resource instance capacity for the given database table. However, once the database engine head node is no longer operating as expected (shown as the negative exit from 1660), the method may include the database service provider revoking any leases on the contingency resource instance capacity (as in 1670), then instantiating another database head node using at least some of the contingency resource instance(s), and continuing (or resuming) receiving and processing read and/or write requests (as in 1680). For example, any leased contingency resource instances may be reclaimed by the service provider (or a control plane function of the database system) for the use of the database table as part of a failover process, to improve performance by supporting additional scaling or by replacing resource instances executing on lower-performance machines/nodes with resource instances executing on higher-performance machines/nodes, or for other reasons, in some embodiments.

Note that while the contingency resource instance management techniques described again may be particularly well suited to the database systems described above (e.g., because the database engine head nodes are essentially "stateless", as most or all of the database state—at least the state of the data maintained in the database—is held in or by the distributed database-optimized storage system), these techniques may be applied to the management of resource instances for other types of stateless virtual computing services, in other embodiments.

Figure 17:
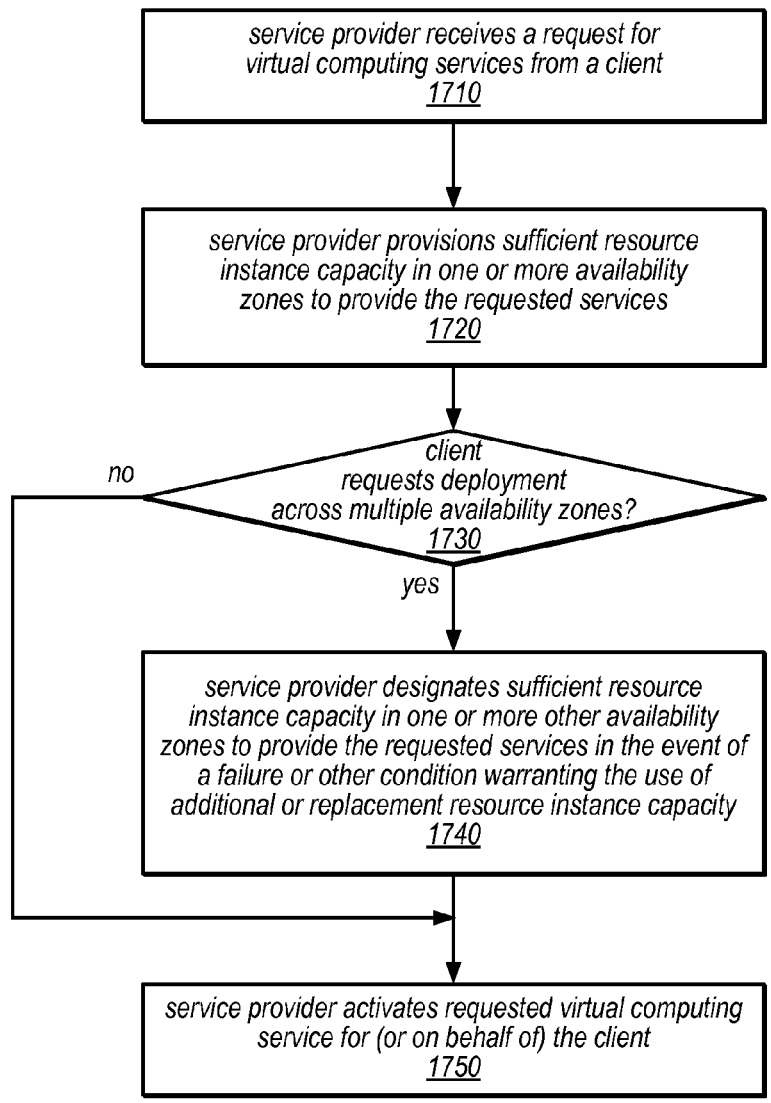
FIG. 17 is a flow diagram illustrating one embodiment of a method for designating contingency resource instances in response to a client request for deployment of a service across availability zones.

One embodiment of a method for designating contingency resource instances in response to a client request for deployment of a service across availability zones is illustrated by the flow diagram in FIG. 17. As illustrated at 1710, in this example, the method may include a service provider receiving a request for virtual computing services (e.g., database services, data storage services, computation services, or other computing services) from a client. The method may also include the service provider provisioning sufficient resource instance capacity in one or more availability zones to provide the requested services, as in 1720. For example, depending on the type of service requested and/or any parameters of any applicable service level agreements (e.g., parameters specifying a desired level of durability, consistency, availability, etc.), the service provider may provision enough storage instance capacity, computation capacity, IOPS capacity, etc. to be able to provide the requested service. In some embodiments, some of this primary resource instance capacity (or various components of the primary resource instances) may be deployed across availability zones (e.g., due to issues of scale), but it may not be sufficient to continue to provide the requested service at the desired performance level following a node-specific or AZ-wide failure or in light of scaling or growth of the service without additional resource instance capacity.

As illustrated in this example, the method may include the client explicitly requesting deployment across multiple availability zones, as in 1730. For example, if the client explicitly requests a multiple-AZ deployment for reasons of durability, security, availability, or other reason(s), shown as the positive exit from 1730, the method may include the service provider designating sufficient resource instance capacity in one or more availability zones other than the availability zone(s) on which the primary resource instance capacity is implemented in order to be able to provide the requested services in the event of a failure or another trigger condition warranting the use of additional or replacement resource instance capacity, as in 1740. Otherwise, shown as the negative exit from 1730, this designation may not be performed. In either case, the method may include the service provider activating the requested virtual computing service for (or on behalf of) the client using the primary resource instance capacity, as in 1750.

Note that in other embodiments, the service provider may designate contingency resource instance capacity in a secondary AZ by default (e.g., in order to meet its own targets for durability, security, consistency, and/or availability, in order to meet various service level agreement levels, or as a default policy) rather than in response to an explicit request from client to do so. In various embodiments, clients may or may not be able to specify whether contingency resource instances are designated on their behalf, as this decision (and any resulting contingency resource instance designations) may be transparent to the clients.

As noted above, the techniques described herein for managing contingency resource instance capacity may be applied when providing services other than the database services described herein, including for other types of database or data storage services. One embodiment of a method for managing contingency resource instance capacity for another type of database or storage service is illustrated by the flow diagram in FIG. 18. As illustrated at 1810, in this example, the method may include provisioning primary storage instance capacity and primary compute instance capacity for a database or storage service in one availability zone. For example, one or more compute instances may be provisioned for database or storage system interface and control functions within one or more primary availability zones or regions. As illustrated in this example, the method may also include provisioning secondary storage instance capacity (e.g., for any of various replication schemes) and designating enough contingency compute instance capacity for additional or replacement interface or control functions (if subsequently needed) in a secondary region or availability zone, as in 1820.

Figure 18:
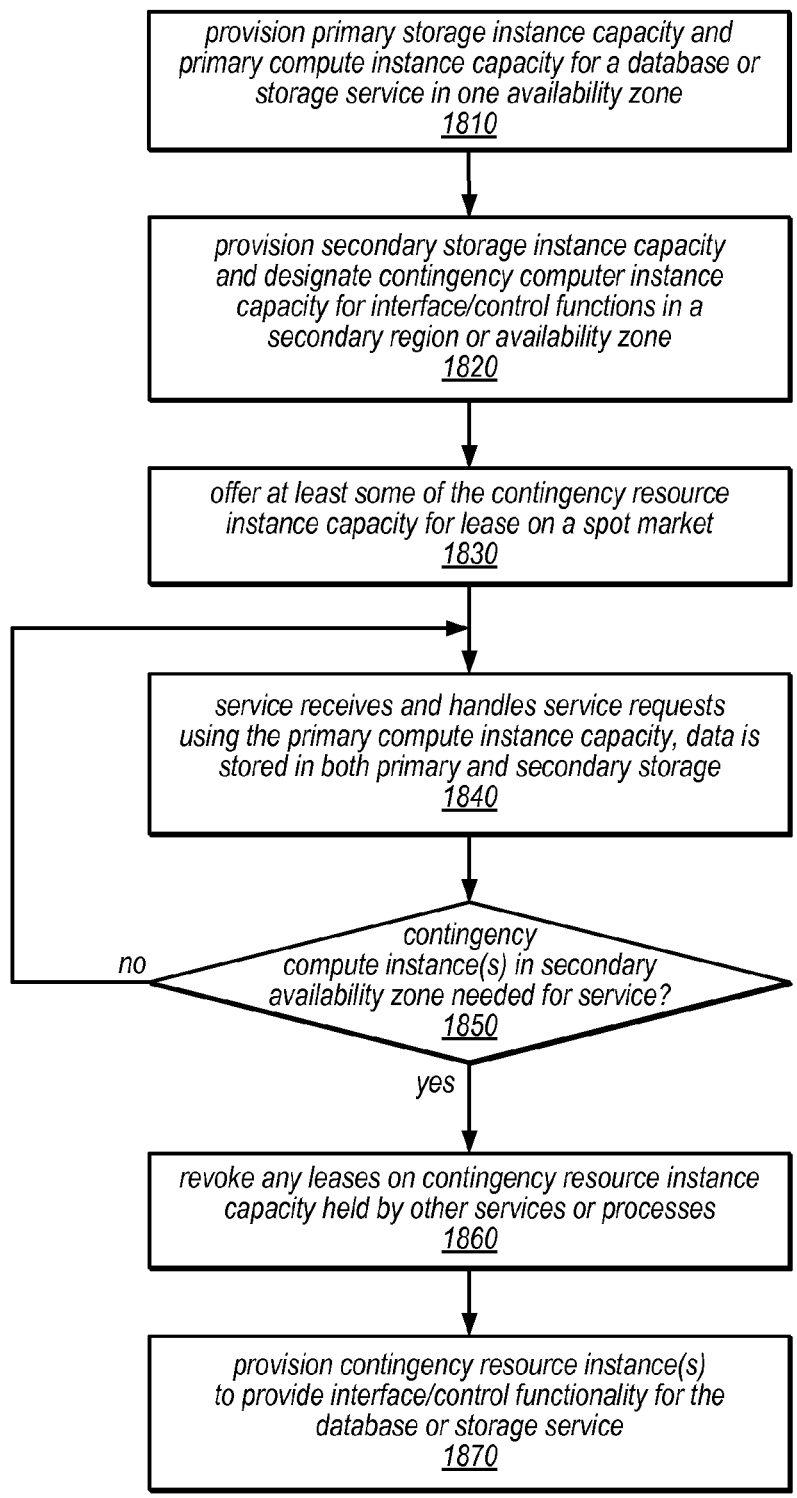
FIG. 18 is a flow diagram illustrating one embodiment of a method for managing contingency resource instance capacity for a database or storage service.

As illustrated at 1830 in FIG. 18, the method may include offering at least some of the contingency resource instance capacity for lease on a spot market, as described herein. The method may also include the service receiving and handling service requests using the primary compute instance capacity, and storing data in both primary and secondary storage instance capacity (e.g., using storage instances in both the primary and secondary AZs), as in 1840. If the contingency compute instance(s) in the secondary availability zone are not needed for the service (shown as the negative exit from 1850), the service may continue receiving and handling service requests using the primary compute instance capacity, and storing data in both primary and secondary storage instance capacity (shown as the feedback from 1850 to 1840).

If the contingency compute instance(s) in the secondary availability zone are needed for the service (shown as the positive exit from 1850), the method may include revoking any leases on contingency resource instance capacity held by other services or processes, as in 1860. For example, such leases may be revoked and the corresponding contingency resource instances applied to providing the database or storage service in response to detecting a trigger condition warranting the use of the contingency resource instances (e.g., a failure of or loss of communication with a computing node or an entire availability zone, a drop in performance due to poor load balancing, increased scaling, or other issues, performance of a maintenance operation involving or affecting the primary resource instances, or other trigger conditions, in different embodiments). As illustrated in this example, applying the reclaimed contingency resource instances to providing the database or storage service may include provisioning one or more of the contingency resource instance(s) to provide interface and/or control functionality for the database or storage service in addition to, or as a replacement for, the primary resource instance that were previously provisioned for this purpose, as in 1870.

The techniques described herein may also be applied to other types of services (e.g., those that are not, primarily, data storage services). For example, a client that is using a large amount of compute and networking capacity (e.g., for video transcoding or another application that requires large amounts of compute and networking capacity) may request that resource instance capacity be available for their use in multiple AZs, but they may not use all of that capacity at the same time. In this case, a service provider may be willing to guarantee that the requested capacity will be available when needed, but while the capacity is not being used in a particular AZ, at least some of it may be offered for lease on the spot market. In addition, in some embodiments, the client may be able to request additional spot capacity (e.g., on top of any reserved and contingent instance capacity). Such as model may allow the client to selectively trade-off between the amount of work that can be performed in a given time period and the price of performing that work, e.g., by allowing them to perform a baseline amount of work using relatively less expensive reserved resource instances or activating contingency and/or spot capacity (which may be priced higher per instance than reserved resource instance capacity) when (and only when) speed is a priority.

Figure 19:
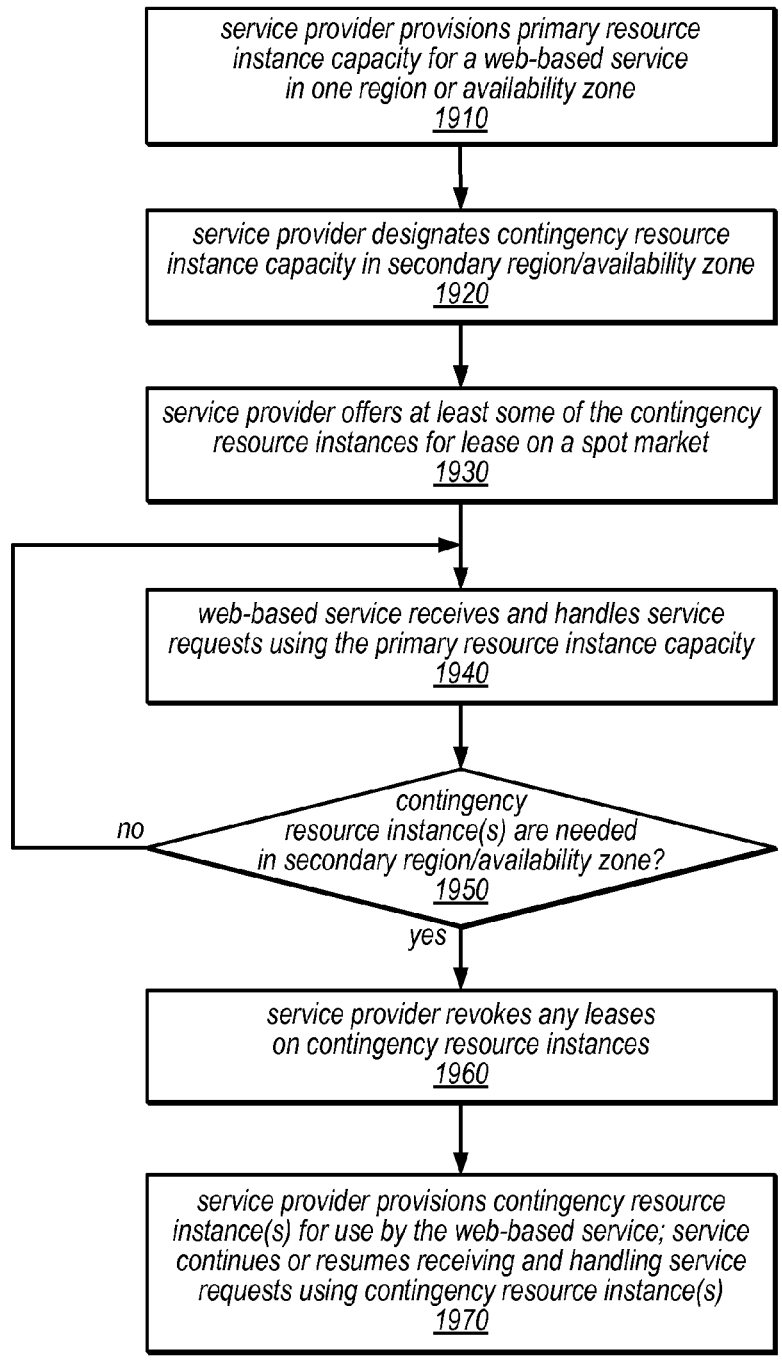
FIG. 19 is a flow diagram illustrating one embodiment of a method for managing contingency resource instance capacity by a web-based services provider.

One embodiment of a method for managing contingency resource instance capacity by a web-based services provider is illustrated by the flow diagram in FIG. 19. As illustrated at 1910, in the example, the method may include a service provider provisioning primary resource instance capacity for a web-based service in one region or availability zone. For example, the service provider may be one that provides database, data storage, computation, and/or other services using pools of resource instances of various types, and provisioning primary resource instance capacity may include reserving resource instance capacity for the exclusive use of the web-based service. As illustrated in this example, the method may include the service provider designating contingency resource instance capacity in a secondary region or availability zone, as in 1920, but not (at least at this point) reserving it for the exclusive use of the web-based service.

As described herein, the method may include the service provider offering at least some of the contingency resource instances for lease on a spot market, as in 1930, while the web-based service receives and handles service requests the using primary resource instance capacity, as in 1940. While the contingency resource instance(s) are not needed in the secondary region or availability zone (shown as the negative exit from 1950), the method may include the web-based service continuing to receive and handle service requests using the primary resource instance capacity. If and when the contingency resource instance(s) are needed in the secondary region or availability zone (e.g., as additional or replacement resource instance capacity, in response to a node-specific or AZ-wide failure, a performance or scaling issue, or another trigger condition being met), the method may include the service provider revoking any leases on the contingency resource instances. This is illustrated in FIG. 19 by the positive exit from 1950 and 1960. The method may then include the service provider provisioning the reclaimed (and/or any as-yet-unused) contingency resource instance(s) for use in providing the web-based service, and the service continuing or resuming receiving and handling service requests using contingency resource instance(s) instead of or in addition to any still-active primary resource instances, as in 1970.

The methods described herein may in various embodiments be implemented by any combination of hardware and software. For example, in one embodiment, the methods may be implemented by a computer system that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 20:
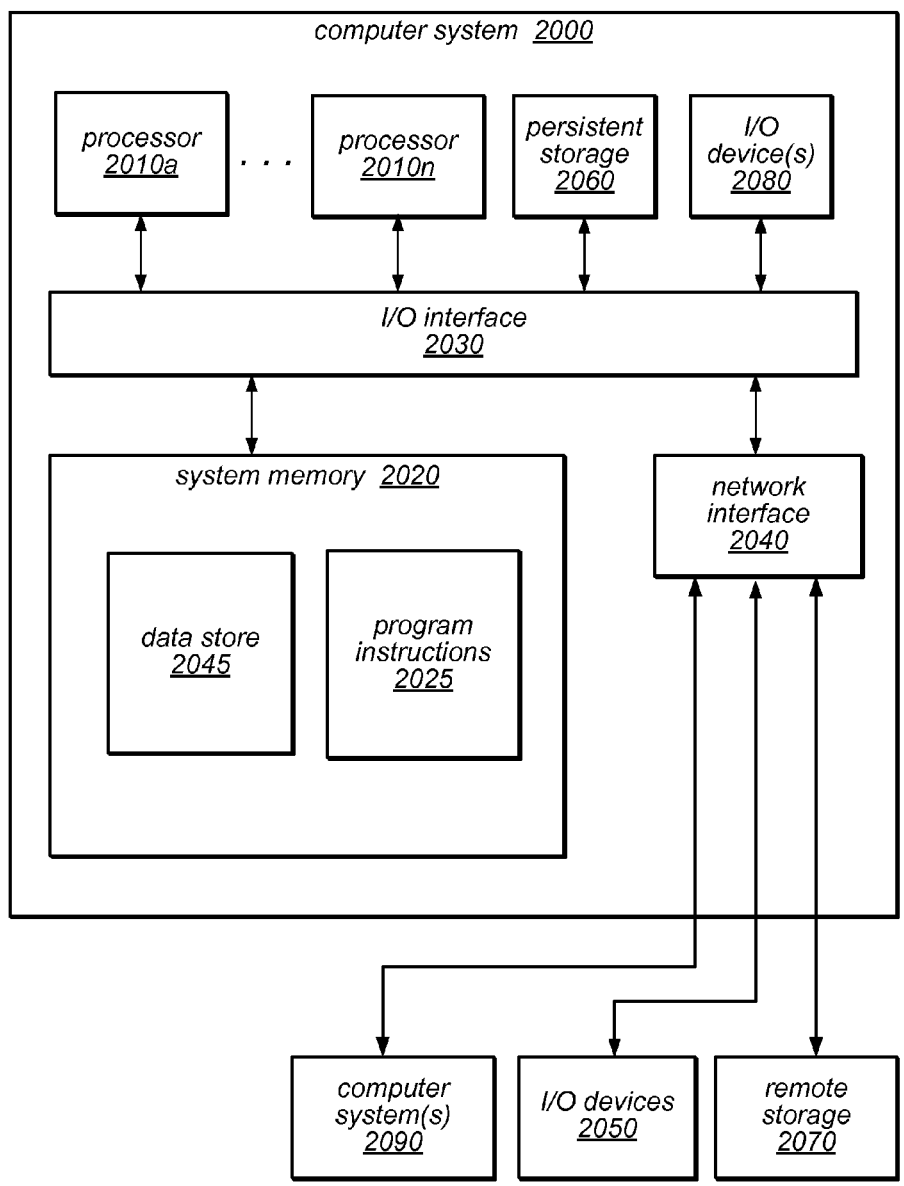
FIG. 20 is a block diagram illustrating a computer system configured to implement at least a portion of a system that provides web-based services using reserved, contingency, and/or interruptible resource instance capacity, according to various embodiments.

FIG. 20 is a block diagram illustrating a computer system configured to implement at least a portion of a system that provides web-based services using reserved, contingency, and/or interruptible resource instance capacity, according to various embodiments. For example, computer system 2000 may be one of a plurality of computing nodes of a distributed system comprising pooled resource instances, and may be configured to implement a database engine head node of a database tier, or one of a plurality of storage nodes of a separate distributed database-optimized storage system that stores database tables and associated metadata on behalf of clients of the database tier, in various embodiments. In other embodiments, computer system 2000 may (e.g., along with other computer systems or nodes thereof) be configured to provide other types of services using reserved, contingency, and/or interruptible resource instance capacity in one or more resource instance pools. For example, computer system 2000 may be configured to implement a portion or all of the functionality of a pricing manager, a resource manager, an interface manager, various resource instances, and/or various execution platforms, as described herein. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090) in the same or a different availability zone.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed database-optimized storage system that stores database tables and associated metadata on behalf of clients of the database tier, in different embodiments. In some embodiments, program instructions 2025 may implement multiple separate clients, server nodes, and/or other components of a web-based services platform (e.g., a pricing manager, a resource manager, an interface manager, various resource instances, and/or various execution platforms).

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein. In embodiments in which computer system 2000 implements a component of a service other than a database service, data store 2045 may store any type of data usable by that service (including, but not limited to, data input to or generated by the service, metadata input to or produced by the service, execution parameter values, interruptibilty parameter values, service request parameter values, service level agreement parameter values, mappings between resource instances and the services for which they are reserved or designated as contingency resources, customer or subscriber information, or state information for various resource instances).

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 20 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A computing system, comprising:
a plurality of computing nodes, each of which comprises at least one processor and a memory;
wherein one or more reserved resource instances executing on the plurality of computing nodes implement a database service, and wherein the database service comprises a database engine head node and two or more server nodes of a distributed storage service that stores portions of database tables as respective data pages on one or more storage devices;
wherein one or more other resource instances in a resource instance pool are designated as contingency resource instances for the database service, but are not reserved for the exclusive use of the database service;
wherein, while the database engine head node is operating as expected:
the database engine head node is configured to:
receive, from a client of the database service, one or more write requests, each directed to a respective data record in a database table and specifying a modification to be made to the respective data record; and
route information about the specified modifications to particular ones of the server nodes of the distributed storage service;
the server nodes of the distributed storage service are configured to:
apply the specified modifications; and
a resource management component executing on one of the computing nodes is configured to lease one or more of the contingency resource instances to a client under a spot market model, wherein leases for the contingency resource instances are revocable by the resource management component when they are needed for the use of the database service; and
wherein, in response to determining that the database engine head node is no longer operating as expected, the resource management component is configured to:
revoke a lease for at least one of the one or more contingency resource instances;
reserve the at least one of the contingency resource instances for the exclusive use of the database service; and
instantiate another database engine head node using the at least one of the contingency resource instances.

2. The system of claim 1, wherein the at least one of the contingency resource instances is hosted on a given one of the plurality of computing nodes other than a computing node on which the database engine head node is implemented.

3. The system of claim 1, wherein the contingency resource instances are hosted in a different availability zone or region than one or more availability zones or regions in which the reserved resource instances are hosted.

4. The system of claim 3, wherein a subset of the two or more server nodes of the distributed storage service are implemented using reserved resource instances in the different availability zone or region.

5. The system of claim 1, wherein said determining that the database engine head node is no longer operating as expected comprises detecting a failure of a computing node on which the database engine head node was implemented.

6. The system of claim 1,
wherein, for each of the one or more write requests, said routing comprises:
generating a redo log record representing the modification to be made to the given data record; and
sending the redo log record, but not a data page comprising the given data record, to a particular server node of the distributed storage service that stores a version of the data page comprising the given data record; and
wherein, for each of the one or more write requests, said applying the modification comprises:
receiving the redo log record from the database engine head node;
writing the redo log record to one or more storage devices;
returning, to the database engine head node, an acknowledgement that the redo log record was written; and
subsequent to returning the acknowledgement:
generating a current version of the data page comprising the given data record, wherein to generate the current version of the data page, the particular server node of the distributed storage service is configured to apply the received redo log record and one or more other redo log records representing modifications to the data page to a previously stored version of the data page; and
writing the current version of the data page to one or more storage devices.

7. A method, comprising:
performing, by one or more computers:
receiving a request for database services, wherein the request specifies that a database should be deployed on the one or more computers;
reserving primary resource instance capacity for the database, wherein the primary resource instance capacity is sufficient to implement the requested database;
designating contingency resource instance capacity for the database;
while the database operates as expected using the primary resource instance capacity:
receiving and routing database queries to one or more storage nodes using the primary resource instance capacity; and
leasing at least a portion of the contingency resource instance capacity on a spot market, wherein said leasing comprises providing the at least a portion of the contingency resource instance capacity for a use by an entity other than the database until and unless a trigger condition is detected indicating that it is needed by the database;
detecting a trigger condition warranting use of the at least a portion of the contingency resource instance capacity by the database; and
in response to said detecting the trigger condition, revoking a least on the at least a portion of the contingency resource instance capacity.

8. The method of claim 7, further comprising, in response to said detecting:
reserving the at least a portion of the contingency resource instance capacity for the database; and
instantiating one or more resource instances of the at least a portion of the contingency resource instance capacity as additional resource instances for the database or as replacements for one or more primary resource instances for the database.

9. The method of claim 7,
wherein said reserving comprises reserving the primary resource instance capacity for the database in one or more availability zones;

wherein said designating comprises designating the contingency resource instance capacity for the database in an availability zone other than the one or more availability zones; and
wherein said detecting a trigger condition comprises detecting a failure of a computing node in one of the one or more availability zones on which one or more instances of the primary resource instance capacity were executing.

10. The method of claim 7,
wherein said reserving comprises reserving the primary resource instance capacity for the database in one or more availability zones;
wherein said designating comprises designating the contingency resource instance capacity for the database in an availability zone other than the one or more availability zones; and
wherein said detecting a trigger condition comprises detecting a failure affecting availability of all computing nodes in one of the one or more availability zones.

11. The method of claim 7,
wherein said detecting a trigger condition comprises detecting a failure of a computing node on which one or more resource instances of the primary resource instance capacity were executing;
wherein the method further comprises, in response to said detecting, designating the one or more resource instances of the primary resource instance capacity as contingency resource instances for the database.

12. The method of claim 7, wherein said designating comprises designating one or more particular resource instances as contingency resource instances for the database.

13. The method of claim 7, wherein pricing for designating each of the resource instances of the contingency resource instance capacity is lower than pricing for reserving each of the resource instances of the primary resource instance capacity.

14. The method of claim 7, wherein pricing for leasing each of the resource instances of the contingency resource instance capacity is lower than pricing for reserving each of the resource instances of the primary resource instance capacity.

15. A non-transitory, computer-readable storage medium storing program instructions that when executed on one or more computers cause the one or more computers to collectively implement one or more web-based services, wherein the program instructions cause the one or more computers to perform:
provisioning a plurality of resource instances as a pool of reserved resource instances for one of the one or more web-based services;
designating one or more other resource instances as a pool of contingency resource instances for the one of the one or more web-based services;
providing the one of the one or more web-based services using resource instances in the pool of reserved resource instances;
leasing at least a portion of the resource instances in the pool of contingency resource instances for use by another one of the one or more web-based services;
detecting a condition warranting use of the at least a portion of the resource instances in the pool of contingency resource instances by the one of the one or more web-based services;
in response to said detecting:
revoking a lease on the at least a portion of the resource instances in the pool of contingency resource instances;
removing the at least a portion of the resource instances in the pool of contingency resource instances from the pool of contingency resource instances; and
provisioning the at least a portion of the resource instances removed from the pool of contingency resource instances as reserved resource instances for the one of the one or more web-based services.

16. The non-transitory, computer-readable storage medium of claim 15, wherein said detecting a condition comprises detecting a failure condition on the one or more computers.

17. The non-transitory, computer-readable storage medium of claim 15, wherein said detecting a condition comprises detecting that a scaling of the one of the one or more web-based services cannot be supported using the pool of reserved resource instances.

18. The non-transitory, computer-readable storage medium of claim 15, wherein said detecting a condition comprises determining that performance of the one of the one or more web-based services would be improved by provisioning the at least a portion of the resource instances removed from the pool of contingency resource instances as additional resource instances for the one of the one or more web-based services or as replacements for one or more of the reserved resource instances for the one of the one or more web-based services.

19. The non-transitory, computer-readable storage medium of claim 15, wherein the one of the one or more web-based services comprises a database service or a data storage service.

20. The non-transitory, computer-readable storage medium of claim 15, wherein the one of the one or more web-based services provides computation services.

21. The non-transitory, computer-readable storage medium of claim 15, wherein the other one of the one or more web-based services provides virtual computing services for a stateless application.

22. The non-transitory, computer-readable storage medium of claim 15,
wherein said provisioning comprises provisioning a plurality of resource instances in a given availability zone;
wherein said designating comprises designating one or more other resource instances in another availability zone;
wherein said provisioning and said designating are performed in response to receiving a request for deployment of the one of the one or more web-based services across multiple availability zones; and
wherein an availability zone comprises a collection of computing nodes that executes on an infrastructure that is physically distinct from an infrastructure on which other computing nodes execute.

* * * * *